US009290948B2

(12) United States Patent
Cappelle et al.

(10) Patent No.: US 9,290,948 B2
(45) Date of Patent: Mar. 22, 2016

(54) FLOOR PANEL

(75) Inventors: Mark Cappelle, Staden (BE); Guy Van Hooydonck, Schoten (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

(21) Appl. No.: 13/144,782

(22) PCT Filed: Jan. 14, 2010

(86) PCT No.: PCT/IB2010/050153
§ 371 (c)(1),
(2), (4) Date: Jul. 15, 2011

(87) PCT Pub. No.: WO2010/082171
PCT Pub. Date: Jul. 22, 2010

(65) Prior Publication Data
US 2011/0271632 A1    Nov. 10, 2011

Related U.S. Application Data

(60) Provisional application No. 61/223,869, filed on Jul. 8, 2009.

(30) Foreign Application Priority Data

Jan. 16, 2009  (BE) .................................. 2009/0025
Apr. 1, 2009   (DE) ..................... 20 2009 004 530 U

(51) Int. Cl.
E04F 15/02    (2006.01)
F16B 5/00     (2006.01)
E04F 15/04    (2006.01)

(52) U.S. Cl.
CPC ............... *E04F 15/02* (2013.01); *F16B 5/0056* (2013.01); *E04F 15/04* (2013.01);
(Continued)

(58) Field of Classification Search
CPC . Y10T 403/54; Y10T 403/581; Y10S 292/38; Y10S 292/53; E04F 2201/0552; E04F 2201/0558; E04F 2201/0594; E04F 2201/0138; E04F 15/02; E04F 15/02038; E04F 2201/0176; E04F 2201/0523; E04F 2201/0115; E04F 2201/0588; E04F 2201/049; E04F 15/04; F16B 5/0056

USPC ............... 52/588.1, 582.1, 581, 582.2, 590.2, 52/592.1; 1/588.1, 582.1, 581, 582.2, 1/590.2
See application file for complete search history.

(56) References Cited

U.S. PATENT DOCUMENTS 6,006,486 A    12/1999  Moriau et al.
6,490,836 B1   12/2002  Moriau et al.
(Continued)

FOREIGN PATENT DOCUMENTS

CA          991373       6/1976
DE          20008708     9/2000
(Continued)

OTHER PUBLICATIONS

ISR and Written Opinion in PCT/IB2010/050153, Jan. 5, 2011.
(Continued)

*Primary Examiner* — Robert Canfield
*Assistant Examiner* — Babajide Demuren
(74) *Attorney, Agent, or Firm* — Workman Nydegger

(57) ABSTRACT

Floor panel, which, at least at two opposite sides, includes coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; and wherein the vertically active locking system includes a vertically active locking element, which forms part of an insertion piece provided in the female part; wherein the insertion piece is formed at least of the combination of a bottom part; a back part adjoining thereto and an elastically movable lock-up body directed downward with a free extremity, which lock-up body, by means of a hinge portion, is connected directly or indirectly to the back part.

18 Claims, 15 Drawing Sheets

(52) U.S. Cl.
CPC  *E04F 2201/0115* (2013.01); *E04F 2201/0138* (2013.01); *E04F 2201/0153* (2013.01); *E04F 2201/0176* (2013.01); *E04F 2201/049* (2013.01); *E04F 2201/0523* (2013.01); *E04F 2201/0552* (2013.01); *E04F 2201/0588* (2013.01)

(56) References Cited

U.S. PATENT DOCUMENTS

| | | | |
|---|---|---|---|
| 6,647,690 B1 | 11/2003 | Martensson |
| 6,769,835 B2 | 8/2004 | Stridsman |
| 6,854,235 B2 | 2/2005 | Martensson |
| 6,874,292 B2 | 4/2005 | Moriau et al. |
| 6,928,779 B2 | 8/2005 | Moriau et al. |
| 6,955,020 B2 | 10/2005 | Moriau et al. |
| 6,993,877 B2 | 2/2006 | Moriau et al. |
| 7,040,068 B2 | 5/2006 | Moriau et al. |
| 7,328,536 B2 | 2/2008 | Moriau et al. |
| 7,451,578 B2 | 11/2008 | Hannig |
| 7,467,499 B2 | 12/2008 | Moriau et al. |
| 7,484,337 B2 | 2/2009 | Hecht |
| 7,603,826 B1 | 10/2009 | Moebus |
| 7,617,645 B2 | 11/2009 | Moriau et al. |
| 7,621,092 B2 | 11/2009 | Groeke et al. |
| 7,621,094 B2 | 11/2009 | Moriau et al. |
| 7,634,884 B2 | 12/2009 | Pervan et al. |
| 7,634,886 B2 | 12/2009 | Moriau et al. |
| 7,634,887 B2 | 12/2009 | Moriau et al. |
| 7,637,066 B2 | 12/2009 | Moriau et al. |
| 7,637,067 B2 | 12/2009 | Moriau et al. |
| 7,637,068 B2 | 12/2009 | Pervan |
| 7,640,708 B2 | 1/2010 | Moriau et al. |
| 7,644,554 B2 | 1/2010 | Moriau et al. |
| 7,644,555 B2 | 1/2010 | Moriau et al. |
| 7,644,557 B2 | 1/2010 | Moriau et al. |
| 7,647,741 B2 | 1/2010 | Moriau et al. |
| 7,647,743 B2 | 1/2010 | Moriau et al. |
| 7,650,727 B2 | 1/2010 | Moriau et al. |
| 7,650,728 B2 | 1/2010 | Moriau et al. |
| 7,654,054 B2 | 2/2010 | Moriau et al. |
| 7,658,048 B2 | 2/2010 | Moriau et al. |
| 7,661,238 B2 | 2/2010 | Moriau et al. |
| 7,665,265 B2 | 2/2010 | Moriau et al. |
| 7,665,266 B2 | 2/2010 | Moriau et al. |
| 7,665,267 B2 | 2/2010 | Moriau et al. |
| 7,665,268 B2 | 2/2010 | Moriau et al. |
| 7,669,376 B2 | 3/2010 | Moriau et al. |
| 7,669,377 B2 | 3/2010 | Moriau et al. |
| 7,673,431 B2 | 3/2010 | Moriau et al. |
| 7,677,008 B2 | 3/2010 | Moriau et al. |
| 7,681,371 B2 | 3/2010 | Moriau et al. |
| 7,698,868 B2 | 4/2010 | Moriau et al. |
| 7,698,869 B2 | 4/2010 | Moriau et al. |
| 7,707,793 B2 | 5/2010 | Moriau et al. |
| 7,712,280 B2 | 5/2010 | Moriau et al. |
| 7,726,088 B2 | 6/2010 | Muehlebach |
| 7,726,089 B2 | 6/2010 | Moriau et al. |
| 7,735,288 B2 | 6/2010 | Moriau et al. |
| 7,757,453 B2 | 7/2010 | Moriau et al. |
| 7,762,035 B2 | 7/2010 | Cappelle |
| 7,770,350 B2 | 8/2010 | Moriau et al. |
| 7,810,297 B2 | 10/2010 | Moriau et al. |
| 7,827,754 B2 | 11/2010 | Moriau et al. |
| 7,827,755 B2 | 11/2010 | Moriau et al. |
| 7,841,144 B2 | 11/2010 | Pervan |
| 7,841,145 B2 | 11/2010 | Pervan et al. |
| 7,866,110 B2 | 1/2011 | Pervan |
| 7,980,039 B2 | 7/2011 | Groeke et al. |
| 7,980,043 B2 | 7/2011 | Moebus |
| 8,024,904 B2 | 9/2011 | Hannig |
| 8,042,311 B2 | 10/2011 | Pervan et al. |
| 8,079,196 B2 | 12/2011 | Pervan |
| 8,091,238 B2 | 1/2012 | Hannig |
| 8,132,384 B2 | 3/2012 | Hannig |
| 8,166,723 B2 | 5/2012 | Moriau et al. |
| 8,341,915 B2 | 1/2013 | Pervan et al. |
| 8,365,494 B2 | 2/2013 | Moriau et al. |
| 8,381,477 B2 | 2/2013 | Pervan et al. |
| 8,387,327 B2 | 3/2013 | Pervan |
| 8,516,767 B2 | 8/2013 | Engstrom |
| 8,621,814 B2 | 1/2014 | Cappelle |
| 8,631,621 B2 | 1/2014 | Hannig |
| 8,677,714 B2 | 3/2014 | Pervan |
| 2003/0024200 A1 | 2/2003 | Moriau et al. |
| 2003/0024201 A1 | 2/2003 | Moriau et al. |
| 2003/0029115 A1 | 2/2003 | Moriau et al. |
| 2003/0029116 A1 | 2/2003 | Moriau et al. |
| 2003/0029117 A1 | 2/2003 | Moriau et al. |
| 2003/0180091 A1 | 9/2003 | Stridsman |
| 2004/0068954 A1 | 4/2004 | Martensson |
| 2004/0128934 A1 | 7/2004 | Hecht |
| 2004/0211143 A1 | 10/2004 | Hanning |
| 2005/0160694 A1 | 7/2005 | Pervan |
| 2005/0284075 A1 | 12/2005 | Moriau et al. |
| 2005/0284076 A1 | 12/2005 | Moriau et al. |
| 2006/0005499 A1 | 1/2006 | Moriau et al. |
| 2006/0025370 A1 | 2/2006 | Trask et al. |
| 2006/0032177 A1 | 2/2006 | Moriau et al. |
| 2006/0064940 A1 | 3/2006 | Cappelle |
| 2006/0196138 A1 | 9/2006 | Moriau et al. |
| 2006/0201095 A1 | 9/2006 | Moriau et al. |
| 2006/0225370 A1 | 10/2006 | Moriau et al. |
| 2006/0225377 A1 | 10/2006 | Moriau et al. |
| 2006/0236630 A1 | 10/2006 | Moriau et al. |
| 2006/0236631 A1 | 10/2006 | Moriau et al. |
| 2006/0236632 A1 | 10/2006 | Moriau et al. |
| 2006/0236633 A1 | 10/2006 | Moriau et al. |
| 2006/0236634 A1 | 10/2006 | Moriau et al. |
| 2006/0236635 A1 | 10/2006 | Moriau et al. |
| 2006/0236636 A1 | 10/2006 | Moriau et al. |
| 2006/0236637 A1 | 10/2006 | Moriau et al. |
| 2006/0236638 A1 | 10/2006 | Moriau et al. |
| 2006/0236642 A1 | 10/2006 | Pervan |
| 2006/0236643 A1 | 10/2006 | Moriau et al. |
| 2006/0248829 A1 | 11/2006 | Moriau et al. |
| 2006/0248830 A1 | 11/2006 | Moriau et al. |
| 2006/0248831 A1 | 11/2006 | Moriau et al. |
| 2006/0254183 A1 | 11/2006 | Moriau et al. |
| 2006/0254184 A1 | 11/2006 | Moriau et al. |
| 2006/0254185 A1 | 11/2006 | Moriau et al. |
| 2006/0260249 A1 | 11/2006 | Moriau et al. |
| 2006/0272263 A1 | 12/2006 | Moriau et al. |
| 2007/0006543 A1 | 1/2007 | Engstrom |
| 2007/0094986 A1 | 5/2007 | Moriau et al. |
| 2007/0094987 A1 | 5/2007 | Moriau et al. |
| 2007/0107360 A1 | 5/2007 | Moriau et al. |
| 2007/0107363 A1 | 5/2007 | Moriau et al. |
| 2007/0193178 A1 | 8/2007 | Groeke et al. |
| 2007/0251188 A1 | 11/2007 | Moriau et al. |
| 2008/0010928 A1 | 1/2008 | Moriau et al. |
| 2008/0010929 A1 | 1/2008 | Moriau et al. |
| 2008/0010938 A1 | 1/2008 | Hannig |
| 2008/0034708 A1 | 2/2008 | Pervan |
| 2008/0053027 A1 | 3/2008 | Moriau et al. |
| 2008/0053028 A1 | 3/2008 | Moriau et al. |
| 2008/0060309 A1 | 3/2008 | Moriau et al. |
| 2008/0060310 A1 | 3/2008 | Moriau et al. |
| 2008/0060311 A1 | 3/2008 | Moriau et al. |
| 2008/0066415 A1 | 3/2008 | Pervan et al. |
| 2008/0066416 A1 | 3/2008 | Moriau et al. |
| 2008/0134607 A1 | 6/2008 | Pervan et al. |
| 2008/0134613 A1 | 6/2008 | Pervan |
| 2008/0134614 A1 | 6/2008 | Pervan et al. |
| 2008/0155930 A1 | 7/2008 | Pervan et al. |
| 2008/0236088 A1 | 10/2008 | Hannig |
| 2008/0295432 A1 | 12/2008 | Pervan et al. |
| 2009/0019806 A1* | 1/2009 | Muehlebach ................ 52/588.1 |
| 2009/0133358 A1 | 5/2009 | Hecht |
| 2009/0193741 A1 | 8/2009 | Cappelle |
| 2009/0217615 A1 | 9/2009 | Engstrom |
| 2009/0249733 A1 | 10/2009 | Moebus |
| 2010/0043333 A1 | 2/2010 | Hannig |
| 2010/0281803 A1 | 11/2010 | Cappelle |

(56) References Cited

U.S. PATENT DOCUMENTS

| | | |
|---|---|---|
| 2010/0319292 A1 | 12/2010 | Moriau et al. |
| 2011/0023405 A1 | 2/2011 | Moriau et al. |
| 2011/0088345 A1 | 4/2011 | Pervan |
| 2011/0088346 A1 | 4/2011 | Hanning |
| 2011/0167750 A1 | 7/2011 | Pervan |
| 2011/0167751 A1 | 7/2011 | Engstrom |
| 2011/0271631 A1 | 11/2011 | Engstrom |
| 2011/0271632 A1 | 11/2011 | Cappelle et al. |
| 2012/0011796 A1 | 1/2012 | Hannig |
| 2012/0031029 A1 | 2/2012 | Pervan et al. |
| 2012/0036804 A1 | 2/2012 | Pervan |
| 2012/0042595 A1 | 2/2012 | De Boe |
| 2012/0055112 A1 | 3/2012 | Engstrom |
| 2012/0073235 A1 | 3/2012 | Hannig |
| 2013/0081349 A1 | 4/2013 | Pervan et al. |
| 2013/0104487 A1 | 5/2013 | Moriau et al. |
| 2013/0145708 A1 | 6/2013 | Pervan |
| 2014/0033630 A1 | 2/2014 | Engstrom |
| 2014/0053497 A1 | 2/2014 | Pervan et al. |

FOREIGN PATENT DOCUMENTS

| | | |
|---|---|---|
| DE | 20112474 | 12/2002 |
| DE | 29924454 | 5/2003 |
| DE | 102004055951 | 7/2005 |
| DE | 102004001363 | 8/2005 |
| DE | 102005002297 | 8/2005 |
| DE | 202007000310 | 4/2007 |
| DE | 202008008597 | 8/2008 |
| EP | 1415056 | 7/2002 |
| EP | 1350904 | 4/2003 |
| EP | 1 420 125 A2 | 5/2004 |
| EP | 1282752 | 10/2004 |
| EP | 1159497 | 9/2005 |
| EP | 1818478 | 1/2007 |
| JP | 7300979 | 11/1995 |
| SE | 515324 | 7/2001 |
| WO | 9747834 | 12/1997 |
| WO | 2004079130 | 9/2004 |
| WO | 2005054599 | 6/2005 |
| WO | 2006/032398 A1 | 3/2006 |
| WO | 2006043893 | 4/2006 |
| WO | 2006104436 | 10/2006 |
| WO | 2007008139 | 1/2007 |
| WO | 2007/015669 A2 | 2/2007 |
| WO | 2007079845 | 7/2007 |
| WO | 2009066153 | 5/2009 |

OTHER PUBLICATIONS

International Search Report and Written Opinion of Corresponding PCT Application No. PCT/IB2008/003133, Oct. 8, 2009.

Search Report from Belgium Patent Application No. 2007/0567, Jul. 2, 2008.

* cited by examiner

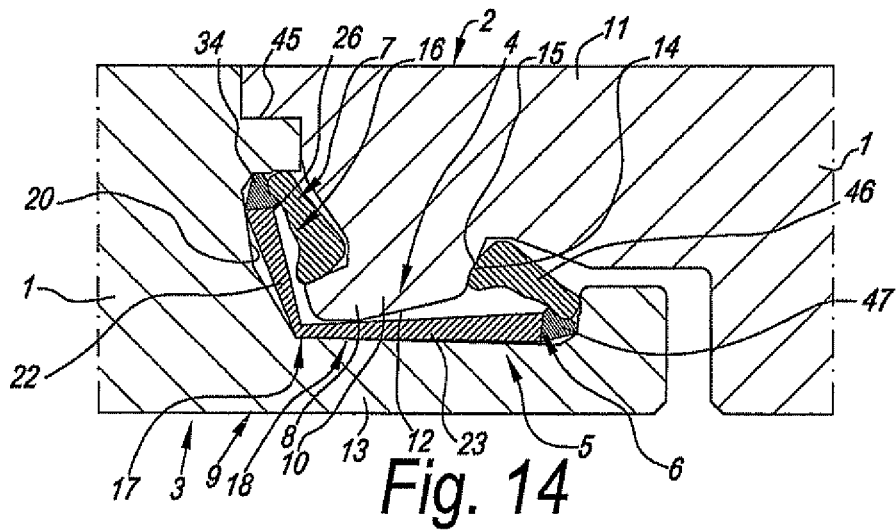
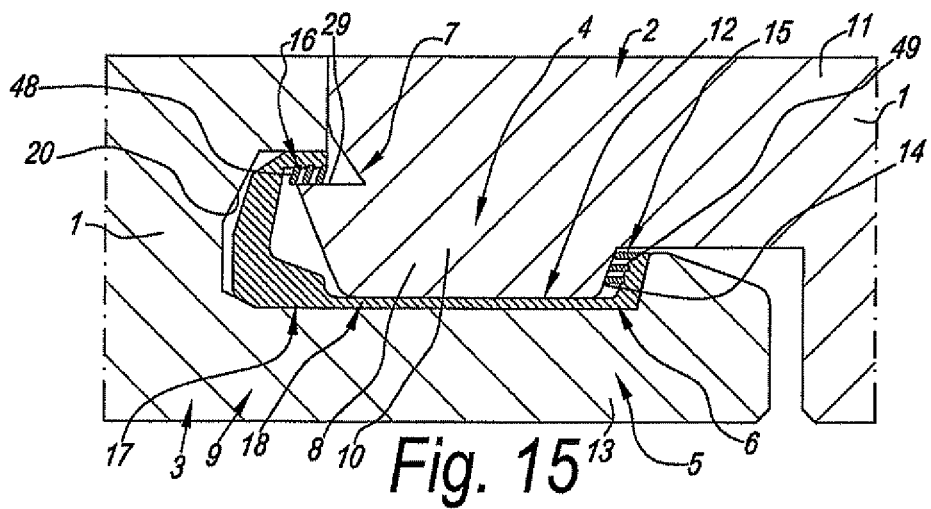
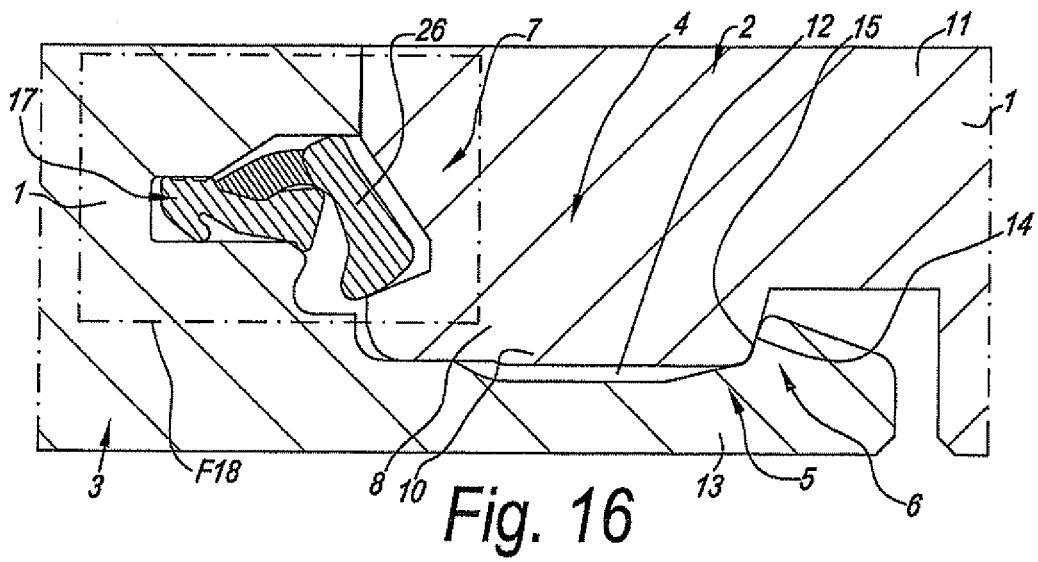

FLOOR PANEL

This application claims the benefit under 35 U.S.C. 119 (e) to the U.S. provisional application No. 61/223,896 filed on Jul. 8, 2009.

BACKGROUND OF THE INVENTION

1. Field of the Invention

This invention relates to a floor panel.

More particularly, it relates to a floor panel which, at least at two opposite sides, comprises coupling parts, in the form of a male coupling part and a female coupling part, respectively, which allow that two of such floor panels can be connected to each other at said sides by providing one of these floor panels with the pertaining male part, by means of a downward movement, in the female part of the other floor panel, such that therein at least a locking in horizontal direction is obtained.

2. Related Art

Couplings, which allow coupling two floor panels with each other by providing one of these floor panels in the other by a downward movement, in practice are divided into two types, namely, a first type wherein the coupling parts provide exclusively for a horizontal locking without any locking in vertical direction, and a second type wherein both a horizontal and a vertical locking are provided.

The couplings of the first kind are also known as so-called "drop-in" systems. Floor panels equipped therewith at two opposite sides are known, amongst others, from CA 991.373 and JP 07-300979. As is evident from these patent documents, such "drop-in" systems often are applied at a first pair of opposite sides of the floor panels only, whereas then at the second pair of opposite sides coupling parts are applied which, in the coupled condition of two floor panels, provide for a vertical as well as a horizontal locking and which allow that two of such floor panels can be coupled to each other by means of a turning movement. Floor panels with such combination of coupling parts offer the advantage that they can easily be installed successively in rows, simply by coupling each new floor panel to be installed to the preceding row of floor panels by means of the turning movement and, when turning them downward, providing for that such floor panel simultaneously also engages in an already installed previous floor panel of the same row. Thus, the installation of such floor panel only requires a turning and putting down movement, which is a particularly user-friendly installation technique.

A disadvantage of floor panels with such coupling parts consists in that, due to the fact that there is no locking in vertical direction, height differences between the coupled floor panels may occur at the upper surface. For example, such floor panels in a first or last row of a floor covering can turn back upward if they are not held down by a skirting board or the like. Even when such floor panels are provided with a "drop-in" system at only one pair of sides, whereas at their other pair of sides, they are locked in horizontal as well as in vertical direction in respect to adjacent floor panels, height differences may occur between adjacent floor panels at the sides coupled by the "drop-in" system, amongst others, when two adjacent floor panels are stressed differently, or when one floor panel would warp and bend somewhat in respect to the other.

Couplings of the aforementioned second type, also called "push-lock" systems, try to remedy the aforementioned disadvantage by also providing a vertical locking. Such "push-lock" systems can be divided in two different categories, namely, one-piece embodiments and embodiments comprising a separate locking element, which is made as an insertion piece or forms part of such insertion piece, wherein this insertion piece may or may not be fixedly attached to the actual floor panel.

One-piece embodiments are known, amongst others, from the patent documents DE 29924454, DE 20008708, DE 20112474, DE 102004001363, DE 102004055951, EP 1.282.752 and EP 1.350.904. The known one-piece embodiments have the disadvantage that they work relatively unwieldy and that a well-working joining of two floor panels can not always be guaranteed.

Embodiments comprising a separate locking element, which assists in a vertical and possibly also horizontal locking between two coupled floor panels, are known, amongst others, from the patent documents DE 202007000310, DE 102004001363, DE 102005002297, EP 1.159.497, EP 1.415.056B1, EP 1.818.478, WO 2004/079130, WO 2005/054599, WO 2006/043893, WO 2006/104436, WO 2007/008139, WO 2007/079845, SE 515324 and DE 202008008597. Utilizing a separate locking element offers the advantage that the material thereof is independent from the actual floor panel and thus may be chosen optimally in function of the application thereof. In this manner, such insertion pieces, for example, may be realized of synthetic material or metal, which enables realizing strong, however, still easily movable locking portions, which can take up relatively large forces with a minimum contact surface.

From WO 2004/079130, embodiments of "push-lock" systems are known which comprise a separate locking element, which only assists in the horizontal locking between two coupled floor panels.

SUMMARY OF THE DISCLOSURE

The present invention relates to various aspects. According to a number of these aspects, namely, each hereinafter mentioned "first" to "sixteenth" aspect, as well as the eighteenth and nineteenth aspect, the invention relates to floor panels which are equipped with a "push-lock" system of the last-mentioned category, in other words, which comprise a, whether or not fixedly attached, however, separately realized insertion piece. In these aspects, the aim of this invention consists of effecting a further optimization of these "push-lock" systems in floor panels.

To this aim, the invention, according to a first aspect, relates to a floor panel, which, at least at two opposite sides, comprises coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; wherein said male part and female part allow that two of such floor panels can be connected to each other at said sides by providing one of these floor panels with the pertaining male part, by means of a downward movement, in the female part of the other floor panel; and wherein the vertically active locking system comprises a vertically active locking element, which forms part of an insertion piece provided in the female part; with the characteristic that said insertion piece is formed at least of the combination of a bottom part, which, in the coupled condition of two of such floor panels, is situated at least partially underneath said projection, a back part adjoining thereto; and an elastically movable lock-up body directed downward with a free extremity, which lock-up body, by means of a hinge portion, is connected directly or indirectly to the back part, wherein the lock-up body forms a stop-forming locking portion at said extremity, which locking portion can cooperate with a locking portion of a similar coupled floor panel. By making use of an insertion piece which comprises a lock-up body, which is movable by means of a hinge portion, as well as a bottom part, it is obtained that the movement and position of the lock-up body can be kept well under control. The use of a specific hinge portion in fact provides for that the rotation of the lock-up body always takes place around a relatively fixedly defined zone, whereas the use of an insertion piece with a bottom part provides for that the positioning of the insertion piece when being applied always will be the same and faults can not occur therein.

In the mounted condition, the pivotable lock-up body, next to the extremity situated opposite to the free extremity thereof, preferably is pivotable along or against a support surface provided for this purpose and realized in the basic material of the floor panel. On the one hand, by this at least a distinct positioning of the upper side of the lock-up body in height direction is obtained, whereas, on the other hand, the lock-up body provides an optimum support effect.

According to a second aspect, the invention relates to a floor panel, which, at least at two opposite sides, comprises coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; wherein said male part and female part allow that two of such floor panels can be connected to each other at said sides by providing one of these floor panels with the pertaining male part, by means of a downward movement, in the female part of the other floor panel; wherein the vertically active locking system comprises a vertically active locking element, which forms part of an insertion piece provided in the female part; wherein this insertion piece comprises at least, on the one hand, a lock-up body pertaining to the locking element; and, on the other hand, a bottom part, and wherein this bottom part, in the coupled condition of two of such floor panels, is situated at least partially underneath said projection, with the characteristic that said insertion piece consists of a co-extruded synthetic material strip with, seen in cross-section, zones of synthetic material with different properties, more particularly different flexibility. By making use of a co-extruded synthetic material strip, the advantage is created that clearly different functionalities may be given to the different component parts. For example, in the case that use is made of a hinge portion, it may be realized of a more supple and elastic material than the remainder of the component parts.

Although in the advantages described hereafter, coextrusion substantially is applied for realizing a more supple hinge portion, it is clear that it may also be applied for integrating materials with different features at other locations in the insertion piece, with the general advantage that for designers a range of possibilities is offered for adapting such insertion piece to the desired effect.

According to a third aspect, the invention relates to a floor panel, which, at least at two opposite sides, comprises coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; wherein said male part and female part allow that two of such floor panels can be connected to each other at said sides by providing one of these floor panels with the pertaining male part, by means of a downward movement, in the female part of the other floor panel; wherein the vertically active locking system comprises a vertically active locking element, which forms part of an insertion piece provided in the female part; wherein this insertion piece comprises at least, on the one hand, a lock-up body forming part of the locking element, and, on the other hand, a bottom part, and wherein this bottom part, in the coupled condition of two of such floor panels, is situated at least partially underneath said projection, with the characteristic that at the lower side of the projection of the male part and at the upper side of said bottom part, mutually parallel contact surfaces are present which, in the coupled condition of two of such floor panels, cooperate with each other in that the contact surface which is present at the lower side of the projection, seen in cross-section, rests on the contact surface of the bottom part over a certain distance; and that the vertically active locking system is configured such that, in the coupled condition, such floor panel, at its side comprising the male part, in downward direction is exclusively held back by contact surfaces being present between the walls of said projection and said seat. By making use of said parallel support surfaces, a point contact is excluded and an unambiguous resting of the male part on the female part is obtained, this also in that the downward locking of the male part in the female part is formed exclusively by contact surfaces being present between the walls of said projection and said seat.

According to a fourth aspect, the invention relates to a floor panel, which, at least at two opposite sides, comprises coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; wherein said male part and female part allow that two of such floor panels can be connected to each other at said sides by providing one of these floor panels with the pertaining male part, by means of a downward movement, in the female part of the other floor panel; wherein the vertically active locking system comprises a vertically active locking element, which forms part of an insertion piece provided in the female part; wherein this insertion piece comprises at least, on the one hand, a lock-up body and, on the other hand, a bottom part, and wherein this bottom part, in the coupled condition of two of such floor panels, is situated at least partially underneath said projection, with the characteristic that the vertically active locking system comprises a tensioning system with which the male part, in the coupled condition, is pressed on in said seat with a downward-directed tension force. By means of pressing the male part onto the bottom part, a very precise height adjustment with small tolerance deviations is obtained.

According to a fifth aspect of the invention, it relates to a floor panel, which, at least at two opposite sides, comprises coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; wherein said male part and female part allow that two of such floor panels can be connected to each other at said sides by providing one of these floor panels with the pertaining male part, by means of a downward movement, in the female part of the other floor panel; wherein the vertically active locking system comprises a vertically active locking element, which forms part of an insertion piece provided in the female part; wherein this insertion piece, apart from the locking element, also comprises at least a bottom part which, in the coupled condition of two of such floor panels, is situated at least partially underneath said projection, as well as an upwardly directed lip-shaped part forming the horizontally active locking surface pertaining to the female part; with the characteristic that said lip-shaped part is made single-walled. By making use of a single-walled lip-shaped part, it is excluded that it can be impressed, and a positive horizontal locking is obtained. Thus, the lip-shaped part preferably is made rigid and, in mounted condition, rests against the hook-shaped part of the female part. Further, it is preferred that the locking surface formed at the lip-shaped part is inclined at an angle. Another advantage of such lip-shaped part is that the basic material is stressed less during the turning into each other.

According to a sixth independent aspect, the invention relates to a floor panel, which, at least at two opposite sides, comprises coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; wherein said male part and female part allow that two of such floor panels can be connected to each other at said sides by providing one of these floor panels with the pertaining male part, by means of a downward movement, in the female part of the other floor panel; wherein the vertically active locking system comprises a vertically active locking element, which forms part of an insertion piece provided in the female part; and wherein this insertion piece also comprises at least a bottom part which, in the coupled condition of two of such floor panels, is situated at least partially underneath said projection, as well as a back part extending upwardly from the bottom part, to which back part the locking element is connected, whether directly or indirectly; with the characteristic that said bottom part is made thinner than said back part and more particularly is thinner than the average thickness of the back part. The use of a relatively thin bottom part allows a possible integration of the whole also in relatively thin floor panels, whereas on the other hand the relatively thick back part also provides for a solid support and/or attachment of the locking portion.

According to a seventh aspect, the invention relates to a floor panel, which, at least at two opposite sides, comprises coupling parts with which two of such floor panels can be coupled to each other; Wherein these coupling parts form a horizontally active locking system (6) and a vertically active locking system; wherein the horizontally active locking system comprises a male part in the form of a downwardly directed projection and a female part with a seat open towards the top, which have horizontally active locking surfaces; wherein said male part and female part allow that two of such floor panels can be connected to each other at said sides by providing one of these floor panels with the pertaining male part, by means of a downward movement, in the female part (9) of the other floor panel; wherein the vertically active locking system comprises a locking element, which forms part of an insertion piece provided in the female part; wherein this insertion piece also comprises at least a bottom part which, in the coupled condition of two of such floor panels, is situated at least partially underneath said projection; with the characteristic that the male part, in the coupled condition of two of such floor panels, rests on the bottom part and that the insertion piece consists of an extruded synthetic material strip having, at the height of the bottom part, a configuration which contributes to minimizing tolerance deviations in the thickness of the bottom part. By applying such configuration, the influence of tolerance deviations as a consequence of the extrusion of the insertion piece is minimized and a rather precise coupling can be guaranteed.

According to a first possibility, herein a thin-walled bottom part with a thickness of less than 1 millimeter may be used. With extrusion, such small thicknesses have the practical advantage that tolerance can be kept better under control. A second possibility consists in that use is made of a local support part, which will be discussed in the following by means of the examples.

According to an eighth aspect, the invention relates to a floor panel, which, at least at two opposite sides, comprises coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; wherein said male part and female part define hook-shaped parts and allow that two of such floor panels can be connected to each other at said sides by providing one of these floor panels with the pertaining male part, by means of a downward movement, in the female part of the other floor panel; wherein the vertically active locking system comprises a vertically active locking element, which forms part of an insertion piece provided in the female part; wherein this insertion piece also comprises at least a bottom part, which, in the coupled condition of two of such floor panels, is situated at least partially underneath said projection, as well as an upwardly-directed lip-shaped part which forms the horizontally active locking surface pertaining to the female part; with the characteristic that the male part in horizontal direction cooperates with and laterally is held back by the lip-shaped part and in vertical direction is supported exclusively by means of one or more support points, which are active between the actual basic materials from which the hook-shaped parts are realized. According to this eighth aspect, the advantage is obtained that the tolerances of the insertion piece have little or no influence on the precision with which two floor panels are coupled to each other in height, in other words, the precision with which their upper sides are situated in the same plane. The precision then may be realized substantially by means of the machining treatments, for example, milling treatments, by which the male and female parts are realized. At the same time, in horizontal direction actually a sturdy construction is offered, as the insertion piece actually is active in the horizontal locking.

According to a ninth aspect, the invention relates to a floor panel, which, at least at two opposite sides, comprises coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; wherein said male part and female part define hook-shaped parts and allow that two of such floor panels can be connected to each other at said sides by providing one of these floor panels with the pertaining male part, by means of a downward movement, in the female part of the other floor panel; wherein the vertically active locking system comprises a vertically active locking element, which forms part of an insertion piece provided in the female part; and wherein this insertion piece also comprises at least a bottom part which, in the coupled condition of two of such floor panels, is situated at least partially underneath said projection, with the characteristic that the locking surfaces, which provide for the horizontal locking, are realized in the basic material of the floor panels, whereas the male part in downward direction actually is supported on the insertion piece, more particularly on the bottom part thereof. According to this ninth aspect, the advantage is offered that the insertion piece, in coupled condition, is held in its place by the coupling, too, however, that in horizontal direction the connection between the coupled floor panels is not subjected to tolerances with which the insertion piece is realized.

According to a tenth aspect, the invention relates to a floor panel, which, at least at two opposite sides, comprises coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; wherein said male part and female part allow that two of such floor panels can be connected to each other at said sides by providing one of these floor panels with the pertaining male part, by means of a downward movement, in the female part of the other floor panel; wherein the vertically active locking system comprises a vertically active locking element in the form of a lock-up body directed downward with a free extremity, which lock-up body forms part of an insertion piece provided in the female part; with the characteristic that the distance over which the lock-up body extends in height in the coupled condition, is smaller than the height of the back part, however, is larger than ⅓ of the height of the back part. By applying such ratio, a proper locking element, lock-up element, respectively, is maintained, which can perform a proper movement, whereas a the same time an appropriate back part is present, which allows for a proper attachment.

According to an eleventh aspect, the invention relates to a floor panel, which, at least at two opposite sides, comprises coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; wherein said male part and female part allow that two of such floor panels can be connected to each other at said sides by providing one of these floor panels with the pertaining male part, by means of a downward movement, in the female part of the other floor panel; wherein the vertically active locking system comprises a vertically active locking element, which forms part of an insertion piece provided in the female part; wherein this insertion piece, apart from the locking element, also comprises at least a bottom part which, in the coupled condition of two of such floor panels, is situated at least partially underneath said projection, as well as an upwardly directed lip-shaped part forming the horizontally active locking surface pertaining to the female part; with the characteristic that the coupling parts are configured such that two of such floor panels can be turned into each other and/or out of each other by means of a turning movement of the one floor panel in respect to the other floor panel. As in this pivotable coupling, a lip-shaped part, as aforementioned, is applied, the advantage is obtained that this lip-shaped part contributes to receiving the forces during the turning-out and offers an extra support, which excludes that a portion of the hook-shaped part concerned will break off when the floor panels possibly are turned out of each other.

According to a preferred characteristic of the eleventh aspect, such floor panel further is characterized in that the distance, measured in horizontal direction between the upper edge of the floor panel at the location of the female part up to the beginning of the locking surface situated at said lip-shaped part, is larger than the distance, measured in vertical direction, between the upper side of the floor panel and the lower side of the projection of the male part. In this manner, the floor panels, although being of the push-lock type, may be smoothly turned out of each other and possibly into each other.

According to a twelfth aspect, the invention relates to a floor panel, which, at least at two opposite sides, comprises coupling parts with which two of such floor panels can be coupled to each other; wherein these coupling parts form a horizontally active locking system and a vertically active locking system; wherein these coupling parts comprise a male part and a female part; wherein said male part and female part allow that two of such floor panels can be connected to each other at said sides by providing one of these floor panels with the pertaining male part, by means of a downward movement, in the female part of the other floor panel; with the characteristic that at least one of said locking systems makes use of an insertion piece of synthetic material, which is provided with one or more lips which as such are deformable, which lips are located laterally on a wall of the insertion piece and which, in the coupled condition of two of such floor panels, exert a tension force, which presses the coupling parts against one or more well-defined contact surfaces.

It is noted that the invention also relates to all possible combinations of the aforementioned twelve aspects, inasmuch as such combinations do not show any contradictory characteristics. Also, each aspect may be provided with further characteristics, formed by adding partial characteristics from other aspects.

According to a thirteenth aspect, the invention relates to a floor panel, which, at least at two opposite sides, comprises coupling parts with which two of such floor panels can be coupled to each other; wherein these coupling parts form a horizontally active locking system and a vertically active locking system; wherein the horizontally active locking system comprises a male part and a female part, which allow that two of such floor panels can be connected to each other at said sides by providing one of these floor panels with the pertaining male part, by means of a downward movement, in the female part of the other floor panel; wherein the vertically active locking system comprises a locking element, which forms part of an insertion piece provided in one of the respective sides; and wherein this locking element comprises at least a pivotable lock-up body; with the characteristic that the lock-up body, by means of a hinge portion preferably formed of a material portion consisting of a material which is more supple than the material from which the lock-up body is formed, is connected to a basic part pertaining to the insertion piece, wherein the pivotable lock-up body and the basic part are provided with surfaces which, when the lock-up body is pivoted inwards, form guiding surfaces for each other and thereby determine the movement of the lock-up body. The thirteenth aspect offers the advantage that a relatively precise movement is imposed to the lock-up body. Other advantages will become clear from the detailed description.

In particular in respect to embodiments according to the first through eleventh aspects, as well as according to the twelfth aspect, the following is to be noted:

In the case of a "pivotable or bendable lock-up body", it is intended that it is pivotable or bendable in the plane of a cross-section.

The lock-up body preferably is realized as a rigid body. By a "rigid" lock-up body, it is meant that this rigidity exists at least in a cross-sectional plane.

In general, it is noted that the support portion of the lock-up body, around which it is rotatable, is a support portion intended for receiving the forces when the floor panels tend to get out of each other in upward direction. From US 2007/0006543, which corresponds to WO 2007/008139, also a pivotable locking element is known, which, however, contrary to what was mentioned previously, does not rotate around a support point, which, as herein above, is intended for providing a locking support function, which counteracts the unlocking of the floor panels.

Moreover, the hinge portion and the pivotable lock-up body may show one or more additional characteristics, which are known from DE 2020080008597. For example, at the free extremity of the lock-up body, a tensioning system may be provided, such as described in this herein above-mentioned document.

When above a locking surface or contact surface is mentioned, this does not mean that this needs to have a flat shape, and, thus, arcuate shapes for this are not excluded.

It is noted that a lock-up body may consist of any form of portion acting on another panel in order to hold it in its place. Although in the following examples, substantially use is made of pivotable lock-up bodies, it is, thus, not excluded to apply differently shaped lock-up bodies, at least when such pivotable lock-up body does not explicitly have to be present according to the requirement of a respective aspect.

According to a fourteenth aspect, the invention relates to a floor panel, which, at least at two opposite sides, comprises coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; wherein said male part and female part allow that two of such floor panels can be connected to each other at said sides by providing one of these floor panels with the pertaining male part, by means of a downward movement, in the female part of the other floor panel; wherein the vertically active locking system comprises a vertically active locking element, which forms part of an insertion piece provided in the female part; wherein said insertion piece, apart from the locking element, also comprises at least a bottom part, which, in the coupled condition of two of such floor panels, is situated at least partially underneath said projection, with the characteristic that said bottom part, during said downward movement, is elastically deformed and, towards the end of the downward movement, relaxes again at least partially. By utilizing the mechanical energy in the bottom part, novel locking system may be achieved, which, according to preferred embodiments, lead to a strong vertical locking. Moreover, such locking systems are easy to realize. For example, the respective insertion piece can be integrally made from the same material, for example, integrally of a synthetic material, such as high density polyethylene, polyethylene terephthalate or polyvinyl chloride.

According to a preferred embodiment, said bottom part, through said relaxation, supplies energy to the locking element, by which this locking element comes into a position in which it provides for or at least contributes to the vertical locking of the coupled floor panels. Taking the aforementioned position of the locking element may comprise, for example, a click or snap effect, which substantially is created by said relaxation of the bottom part. For example, the bottom part may function in the same manner as a leaf spring, which is tensioned at the beginning of the downward movement and relaxes again at least partially towards the end of the downward movement.

As aforementioned, said insertion piece preferably is made integrally in one and the same material, wherein this insertion piece preferably also comprises an upwardly directed lip-shaped part, which forms the horizontally active locking surface pertaining to the female part.

Preferably, said locking element is rigidly attached to said bottom part. In this embodiment, the tensioning and/or relaxation of the bottom part can be directly converted into a movement of said locking element.

It is clear that the floor panel of the fourteenth aspect of the invention possibly also shows the characteristics of one or more of the previously mentioned aspects or the preferred embodiments thereof, inasmuch as they are not contradictory.

According to a fifteenth aspect, the invention relates to a floor panel, which is made rectangular and/or oblong and, at a first pair as well as at a second pair of two opposite sides, comprises coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; wherein said male part and female part allow that two of such floor panels, on the one hand, can be connected to each other at said first pair of sides by providing one of these floor panels with the pertaining male part, by means of a downward movement, in the female part of the other floor panel, and, on the other hand, can be connected to each other at said second pair of sides by providing one of these floor panels with the pertaining male coupling part, by means of a turning movement around the respective sides, in the female coupling part of the other floor panel, with the characteristic that, at the first pair as well as at the second pair of sides, the vertically active locking system comprises a vertically active locking element, which forms part of an insertion piece, wherein this insertion piece at the first pair of sides is provided in the female coupling part, whereas this insertion piece at the second pair of sides is situated at the male coupling part. According to this fifteenth aspect, the invention allows obtaining floor panels with coupling parts which can be realized in a relatively simple manner, which still can be coupled by means of a so-called fold-down movement, wherein the long sides are coupled to each other by means of a turning movement along the respective sides, and the short sides during the same turning movement automatically perform a downward coupling movement.

According to a first preferred embodiment, said insertion piece of the first pair and the second pair of sides is made identical or almost identical.

According to a second preferred embodiment, said male coupling part and said female coupling part of the first pair of sides and the second pair of sides are made identical or almost identical.

A floor panel showing the characteristics of the above first and/or second preferred embodiment, offers the advantage that both pairs of sides can be realized in an almost identical manner. For example, for milling the coupling parts, identical or almost identical milling tools can be applied.

Preferably, for said insertion piece use is made of an insertion piece as described in any of the preceding aspects.

According to a sixteenth aspect, the present invention relates to a floor panel, which, at least at two opposite sides, comprises coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; wherein said male part and female part allow that two of such floor panels can be connected to each other at said sides by providing one of these floor panels with the pertaining male part, by means of a downward movement, in the female part of the other floor panel; wherein the vertically active locking system comprises a vertically active locking element which is integrally made with an insertion piece which is provided in the female part or forms a portion of the female part; wherein this insertion piece, apart from the locking element, also comprises at least a bottom part, which, in the coupled condition of two of such floor panels, is situated at least partially underneath said projection, with the characteristic that the insertion piece projects in horizontal direction beyond the upper edge of the respective floor panel over a distance which is larger than the distance over which the portion of the female coupling part made in one piece with the floor panel projects beyond this upper edge. A floor panel with the characteristics of the sixteenth aspect of the invention allows achieving an economy of the actual material of the floor panel.

The seventeenth aspect of the invention has no specific connection with the use of a separate insertion piece, however, offers a particular solution for applying certain materials, more particularly wood-based materials, in an efficient manner for a so-called push-lock coupling. According to this seventeenth aspect, the invention relates to a floor panel, which, at least at two opposite sides, comprises coupling parts with which two of such floor panels can be coupled to each other; wherein these coupling parts form a horizontally active locking system and a vertically active locking system, which allow that two of such floor panels can be connected to each other at said sides by providing one of these floor panels, by means of a downward movement, in the other floor panel, wherein the vertically active locking system comprises locking parts engaging one after the other, of which at least one locking part is situated on a lip-shaped bendable part, which extends in the height, with the characteristic that at least said bendable part consists of a pressed fiber material, said material showing a predominant fiber direction and/or predominant fiber planes, wherein this fiber material is positioned such that the predominant fiber direction and/or predominant fiber planes also extend in the height. It is clear that in this manner such materials can be applied for push-lock couplings without having any breaking-off of portions occur as a result of slide-off forces.

More particular, for this seventeenth aspect use shall be made of MDF and HDF, in a manner as will be discussed further in the detailed description.

According to an eighteenth aspect, the invention relates to a floor panel, which, at least at two opposite sides, comprises coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; wherein said male part and female part allow that two of such floor panels can be connected to each other at said sides by providing one of these floor panels with the pertaining male part, by means of a downward movement, in the female part of the other floor panel; wherein the vertically active locking system comprises a vertically active locking element, which forms part of an insertion piece which is provided at one of said two sides; and wherein the locking element is of the type which, during said downward movement, performs a lateral to- and fro-movement, wherein first it is pushed aside in an elastic manner and subsequently moves back in an elastic manner to arrive in a locking position; with the characteristic that the insertion piece is at least composed of, on the one hand, a movable hook-shaped portion with a portion extending laterally substantially in horizontal direction and forming said locking element, and an attachment portion with which the insertion piece is provided in a recess provided for this purpose. Applying a hook-shaped portion with a portion extending laterally substantially in horizontal direction and functioning as a locking element, results in that the locking element itself has a relatively small height and may even be realized as a relatively flat element, wherein forces which have to counteract unlocking are taken up perpendicularly on this flat element. This offers the advantage that no bend or bending can occur in the locking element and as a result the floor panels, at the upper edges concerned, with certainty remain in the same plane. Due to the hook-shaped construction, the advantage is created that the locking element can be supported in a movable manner via the attachment portion such that, on the one hand, it can perform a sufficiently large displacement for joining the floor panels together, and, on the other hand, sufficient own elasticity can be incorporated in the insertion piece for obtaining that the locking element, after having been pushed aside, moves back into the locking position.

According to a nineteenth aspect, the invention relates to a floor panel, which, at least at two opposite sides, comprises coupling parts with which two of such floor panels can be coupled to each other; wherein these coupling parts form a horizontally active locking system and a vertically active locking system; wherein the horizontally active locking system comprises a male part in the form of a downwardly directed projection and a female part with a seat open towards the top, which have horizontally active locking surfaces; wherein said male part and female part allow that two of such floor panels can be connected to each other at said sides by providing one of these floor panels with the pertaining male part, by means of a downward movement, in the female part of the other floor panel; wherein the vertically active locking system comprises a vertically active locking element, which forms part of an insertion piece which is provided at one of said two sides; and wherein the locking element is of the type which, during said downward movement, performs a lateral to- and fro-movement, wherein first it is pushed aside in an elastic manner and subsequently moves back in an elastic manner to arrive in a locking position; characterized in that the insertion piece is at least composed of, on the one hand, a movable portion extending laterally substantially in horizontal direction and forming said locking element, and an attachment portion with which the insertion piece is provided in a recess provided for this purpose, wherein the locking element, viewed in height, as such occupies less than half of the height of the insertion piece and still better occupies less than ⅓ of this height.

As the actual locking element has a small height in respect to the total height of the insertion piece, the advantage is obtained that underneath the locking element relatively much space is offered for providing for a support of the locking element which, on the one hand, allows a proper attachment and, on the other hand, can provide sufficient elastic force and movability for pressing the locking element, after joining two floor panels, into the locked condition.

It is noted that the term "a portion extending laterally substantially in horizontal direction" is to be interpreted broadly as a portion which is performed as a hook portion pointing aside and which preferably is rigidly or almost rigidly in connection with a downwardly directed portion. Preferably, the portion pointing aside has a global direction which, viewed towards the free extremity, forms an angle with the plane of the floor panel which is situated between a downward inclination of 30 degrees and an upward inclination of 60 degrees, and/or the portion pointing aside has a locking surface of which the global direction, viewed towards the free extremity thereof, forms an angle with the plane of the floor panel which is situated between a downward inclination of 30 degrees and an upward inclination of 60 degrees. It is clear that zero degrees also falls within this.

Further, the floor panel which is performed according to the eighteenth or nineteenth aspect, according to various preferred embodiments may show one or more of the following additional characteristics:

the locking element comprises a locking surface and an opposite support surface, and the locking surface is situated at that side of the locking element which also forms the inner corner of the hook-shaped portion;

the hook-shaped portion can be tilted, preferably around a pivot point or pivot zone which is situated lower than and preferably underneath said laterally-extending portion, with the advantage that said movable portion performs a small up and down movement only, which is beneficial for a smooth coupling;

the insertion piece is situated at the female part, preferably in a recess at the proximal side thereof, with the advantage that there is more room for providing said recess in the floor panel;

the hook-shaped portion comprises a downwardly directed portion, wherein this downwardly directed portion is in connection with the attachment portion or as such forms a portion of the attachment portion, and wherein preferably this downwardly directed portion is made more rigid than the remainder of the insertion piece;

the downwardly directed portion is supported at its lower extremity on the bottom of the recess, with the advantage that a precise positioning is obtained;

apart from the downwardly extending portion, the attachment portion comprises an elastic leg extending backward in the groove and extending upward, by which a smooth assembly as well as good features in respect to elastic behavior are obtained;

in downward direction, the male part rests directly on the female part, without intermediary of the insertion piece, such that by an appropriate pressing-on by the insertion piece, the possible height tolerances are determined exclusively by the finishing of the basic materials of the male and the female part;

the insertion piece is situated with its lowermost side or lowermost point higher than the lower side of the male part, with the advantage that a relatively good material thickness is kept underneath the insertion piece, which is beneficial for the stability of the whole;

the movable portion extending laterally substantially in horizontal direction and forming said locking element comprises a locking surface which forms an angle with the plane of the floor panel which is smaller than 45 degrees and still better is smaller than 30 degrees;

behind the locking element, more particularly behind the hook-shaped portion, a free space is present allowing that the locking element freely can move backward.

Preferably, the insertion piece is always made from a rectilinear strip.

Also, the insertion piece is designed such that the hook-shaped portion during coupling moves elastically in respect to the attachment portion, wherein this latter possibly is deformed as such, however, the entire insertion piece as such does not slide to and fro at its place.

It is clear that the coupling parts of the eighteenth and nineteenth aspect in the case of oblong floor panels preferably are provided at the short sides, whereas at the long sides then preferably coupling parts are applied, which allow that the floor panels can be joined into each other by means of a turning movement.

With the intention of better showing the characteristics of the invention, hereafter, as an example without any limitative character, some preferred embodiments are described, with reference to the accompanying drawings, wherein:

BRIEF DESCRIPTION OF THE DRAWINGS

FIGS. 8 to 16, in cross-section, represent different embodiments of the invention;

FIG. 35 represents another step in a method for manufacturing floor panels which comprise an insertion piece, for example, for manufacturing the floor panels of FIGS. 16 to 20 or similar;

DETAILED DESCRIPTION OF PREFERRED EMBODIMENTS OF THE INVENTION

As represented in FIGS. 1 to 4, the invention relates to a floor panel 1, which, at least at two opposite sides 2-3, comprises coupling parts 4-5 with which two of such floor panels 1 can be coupled to each other.

Figure 4:
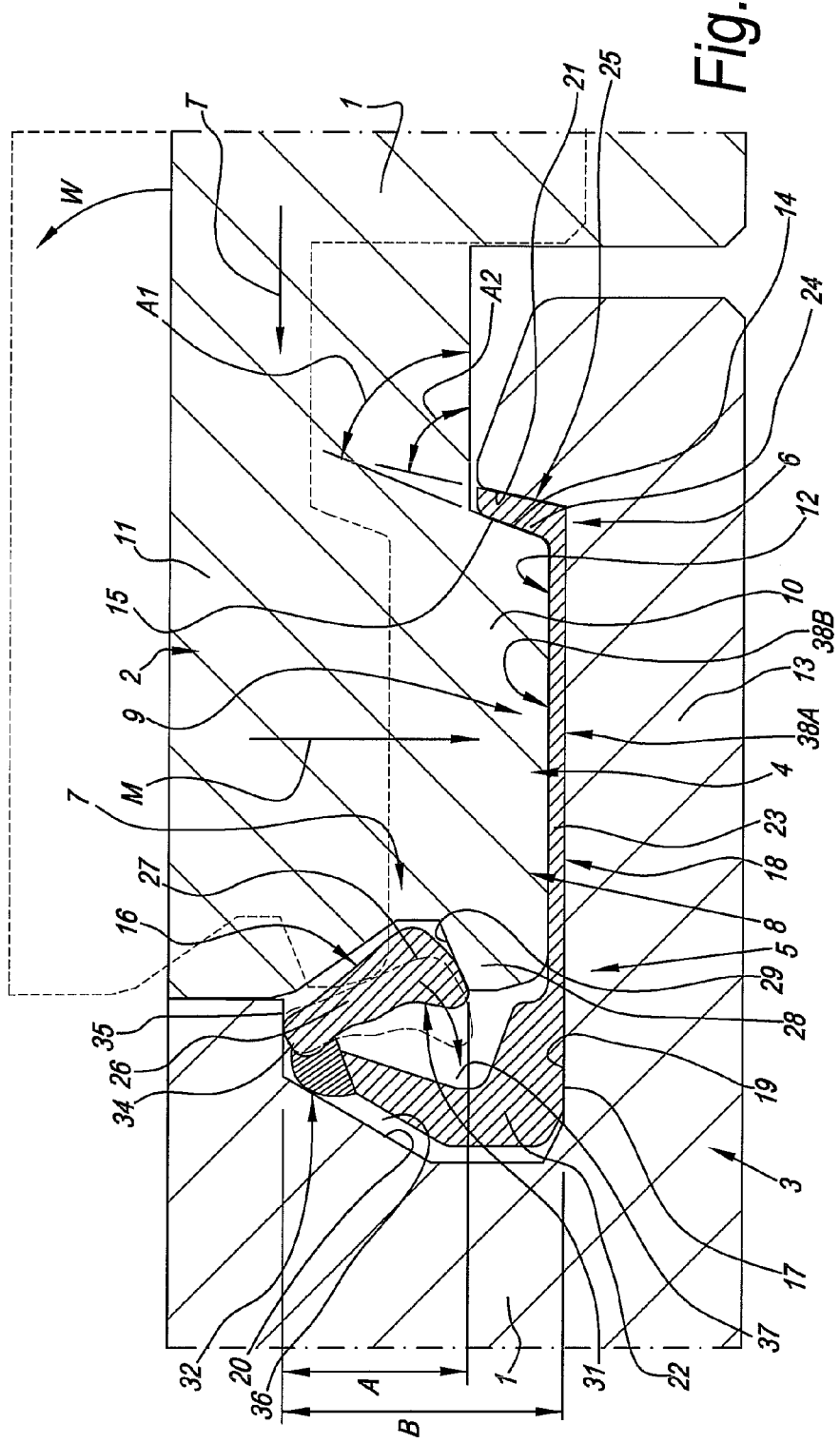
FIG. 4, in cross-section, represents two floor panels, which are made in accordance with FIG. 2, in coupled condition.

As is evident from the coupled condition of FIG. 4, these coupling parts 4-5 comprise a horizontally active locking system 6 and a vertically active locking system 7. The horizontally active locking system 6 comprises a male part 8 and a female part 9, which allow that two of such floor panels 1 can be connected to each other at said sides 2-3 by providing one of these floor panels 1 with the pertaining male part 8, by means of a downward movement M, in the female part 9 of the other floor panel, which movement M is indicated schematically in FIG. 4.

The male part 8 is formed by a downwardly directed projection 10 of a downwardly directed hook-shaped part 11, whereas the female part 9 consists of a seat 12 open towards the top, formed by means of an upwardly directed hook-shaped part 13. The locking in horizontal direction, in other words, the locking which provides for that two coupled floor panels 1 cannot slide apart inadvertently, herein is obtained by the cooperation of horizontally active locking surfaces 14 and 15 at the male part 8 and the female part 9, respectively.

Figure 1:
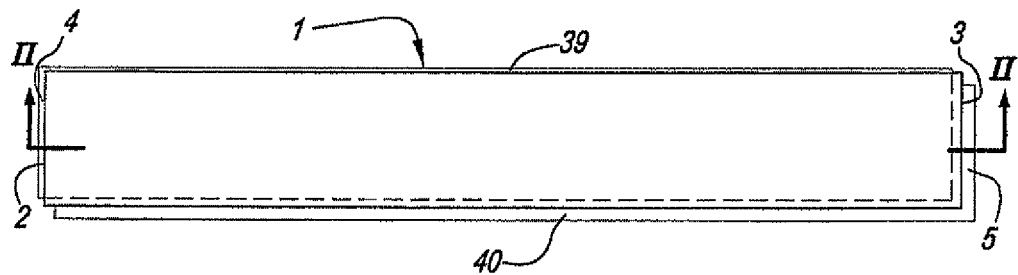
FIG. 1 schematically and in top plan view represents a floor panel according to the invention, FIG. 2, at a larger scale, represents a cross-section according to line II-II in FIG. 1.
Figure 2:
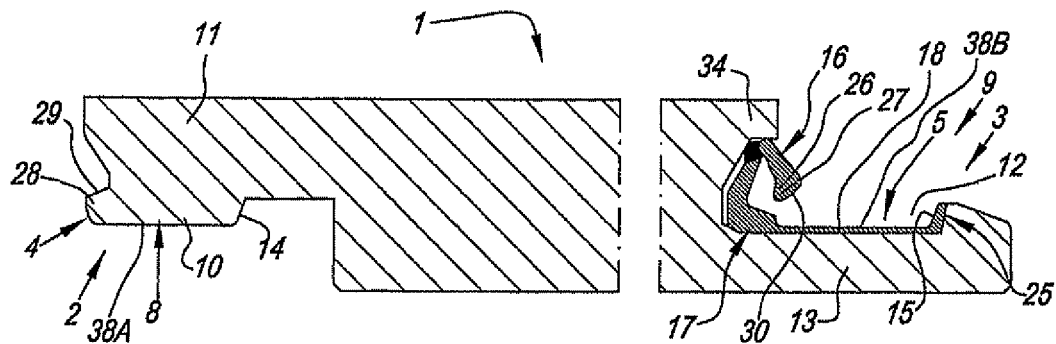
Figure 3:
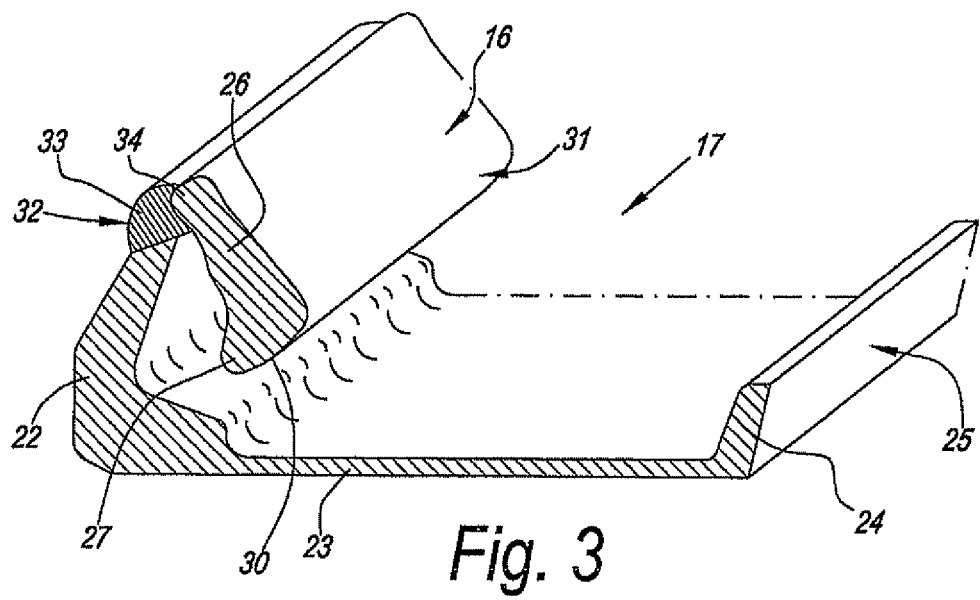
FIG. 3, in perspective and at a larger scale, represents the insertion piece which is provided in the floor panel in FIG. 2.

The vertically active locking system 7 comprises a locking element 16, which forms part of an insertion piece 17 which is provided in a recess 18 at the side 3 of the female part 9. For clarity's sake, the insertion piece 17 is depicted in FIG. 3 in separate condition. As can be seen in this figure, this insertion piece 17 preferably is made as a strip. It is clear that this strip preferably extends over the entire or almost entire length of the side 3.

Preferably, this strip consists of synthetic material, however, it is not excluded to use other materials for this purpose. Further, it is preferred that the strip has a continuous cross-section over its entire length, which renders it simple to manufacture. In the case of a synthetic material strip, preferably use is made of PVC.

In the enlarged view of FIG. 4, it is clear how the strip is attached in the recess 18. In the represented example of FIG. 4, the recess 18 substantially is bordered by a bottom wall 19, a proximally situated wall 20 and a distally situated wall 21.

According to the example of FIG. 4, the insertion piece 17, except the locking element 16, also comprises a back part 22, a bottom part 23, which, in the coupled condition of two of such floor panels 1, is situated at least partially underneath said projection 10, as well as an upwardly directed lip-shaped part 24, one side of which forms said horizontally active locking surface 15, whereas the other side 25 preferably rests against said wall 21. Preferably, the lip-shaped part 24, as depicted in FIG. 4, is made with different inclination angles A1 and A2 at its outer sides, wherein A1 is smaller than A2.

This offers the advantage that the insertion piece 17 is held relatively firm in the recess of the female part, whereas then again the more inclined locking surface 15 in its turn allows performing the coupling and/or uncoupling more smoothly.

In the represented example, the locking element 16 substantially is made as a lock-up body 26, with a stop-forming locking portion 27, which can cooperate with a locking portion 28 at the male part 8 of a coupled similar floor panel 1. Herein, the locking portion 28 preferably is formed by a portion which defines a stop-forming contact surface 29, which to this aim is present in the side 2 and preferably is provided in the core of the floor panel 1 by machining, which contact surface then cooperates with a contact surface 30 at the locking element 16.

In accordance with the aforementioned first aspect of the invention, the insertion piece 17 shows the combination of characteristics that, as aforementioned, it comprises a bottom part 23, which, in the coupled condition of two of such floor panels 1, extends at least partially underneath said projection 10; that it comprises a back part 22, whether or not connected directly thereto; and that, as aforementioned, it comprises a lock-up body 26, which is connected directly or indirectly to the back part and which, with a free extremity 31, is directed downward and which is elastically movable, more particularly pivotable, by means of a hinge portion 32 specifically provided for this purpose. Herein, the downwardly directed free extremity 31 of the lock-up body 26 functions as a locking portion 27. For the advantages obtained by means of this combination, reference is made to the introduction.

In this case, the hinge portion 32 substantially consists of a supple and elastic material portion 33 fulfilling a double function. On the one hand, this material portion 33 then forms a hinge, as it provides for a rather local bending, however, on the other hand, it also provides the necessary elastic force for forcing the locking or lock-up body 26 with its free extremity outward.

As represented, the insertion piece 17 preferably is configured such that the pivotable lock-up body 26, opposite to the extremity 31 forming the locking portion 27, shows a support portion 34, which can be rotated against a support surface 35 pertaining to the floor panel 1 concerned.

The mode of operation of the vertically active locking system can simply be deduced from the figures and is based on the principle that, as is represented in dashed line in FIG. 4, the lock-up body 26, by the contact with the edge of the other floor panel, is folded inward in an elastic manner, after which, once the floor panels have arrived in the same plane, the lock-up element turns back outward in order to obtain the locked condition represented in massive line.

Further, it is noted that the lock-up body 26 between the locking portion 27 and the support portion 34, in other words, between its extremities, as such is free from hinge portions and bending sections. To this aim, thus, the lock-up body 26 is made relatively thick and preferably forms a rigid body, which means that the lock-up body 26 can not be subjected to noticeable deformations between its extremities when pressures are exerted thereon, which usually may occur with "push-lock" couplings.

As represented in FIG. 4, the back part 22 preferably is situated in a lateral cavity 36, which forms part of the recess 18 and extends over the entire or almost entire height between the bottom wall 19 and the support surface 35. The back part 22 itself preferably also has a recess 37, which offers room for the lock-up body 26 when the latter is pressed inward during joining of two of such floor panels 1.

It is noted that the embodiment of FIG. 4 also forms an example of the second aspect of the invention, namely, in that the insertion piece 17 consists of a co-extruded synthetic material strip with, seen in cross-section, zones of synthetic material with different features, more particularly different flexibility, wherein the synthetic material then is chosen in function of the functionality of such zone. In accordance therewith, in FIG. 4 the material portion 33 is realized of a more supple synthetic material than the remaining component parts of the insertion piece 17, such that the material portion 33 functions as a local hinge part and also, due to its elasticity, provides for that the lock-up body 16 is forced outward at its lowermost extremity, thus, in coupled condition is forced into contact with the contact surface 29. The other component parts consist of a relatively sturdy synthetic material. This has the advantage that the lock-up body 16 easily can be made rigid, as a result of which this body comes to sit as a sturdy, not deformable element between the support surface 35 and contact surface 29. As the bottom element 23, too, is made of such sturdier synthetic material, this offers a substantially non-deformable support for the male part 8, at least when it is in contact therewith.

It is clear that such insertion piece 17 can also be composed in other ways by means of co-extrusion, more particularly with another distribution of the zones of different synthetic material, and such in function of an aim to be achieved.

The embodiment of FIG. 4 also forms an example of said third aspect of the invention, namely, in that at the lower side of the projection 10 of the male part 8 and at the upper side of said bottom part 23 mutually parallel contact surfaces, 38A and 38B, respectively, are present, which, in the coupled condition of two of such floor panels 1, cooperate with each other in that the contact surface 38A, seen in cross-section, rests on the contact surface 38B over a certain distance, as well as in that the vertically active locking system 7 is configured such that, in the coupled condition, such floor panel, at its side comprising the male part, is held back in downward direction exclusively by contact surfaces being present between the walls of the projection 10 and said seat 12, in this case, thus, the contact surfaces 38A and 38B and the contact surfaces formed by said locking surfaces 14 and 15.

The fourth aspect of the invention is also applied in FIG. 4, and such in that the vertically active locking system 7 comprises a tensioning system by which the male part 8 in the coupled condition is pressed on in said seat 12 with a downwardly directed tension force. In the embodiment of FIG. 4, this tensioning system is formed by the pivotable lock-up body 16, which, when being pivoted outward, tensions with its contact surface 30 against the contact surface 29 and thus provides a permanent pressing-on force.

It is clear that in the embodiment of FIG. 4 also the fifth aspect of the invention is applied; this in that the lip-shaped part 24 is made single-walled, with the advantage that this offers a not or little flexible locking surface 15, with the advantage that this locking surface 15 forms a rigid, well-defined stop for the locking surface 14 of the male part 8.

The sixth aspect of the invention, too, is to be found in the embodiment of FIG. 4, as the bottom part 23 clearly is made thinner than the aforementioned back part 22, wherein for the thickness of the back part 22 to this aim the average thickness has to be taken.

In the embodiment of FIG. 4, also the seventh aspect of the invention is applied, which, as aforementioned, consists in that the male part 8, in coupled condition of two of such floor panels, rests on the bottom part 23 and that the insertion piece 17 consists of an extruded synthetic material strip, which, at the location of the bottom part, has a configuration which contributes to enabling minimizing tolerance deviations in the thickness of the bottom panel. In the embodiment of FIG. 4, this configuration consists in that the thickness of the bottom part is very restricted and more particularly is smaller than 1 mm.

The embodiment of FIG. 4 further also meets the tenth aspect of the invention, namely, that the insertion piece 17 consists of a back part 22 and a lock-up body 26 directed downward with its free extremity, wherein the height A, over which the lock-up body 26 extends in coupled condition, is smaller than the height B, over which the back part 22 extends, however, wherein the distance A is larger than ⅓ of the distance B.

It is noted that the invention is not limited to floor panels 1 which, at the sides 2-3, can be joined into each other exclusively by a downward movement M, but also relates to floor panels 1 of which the respective "push-lock" coupling also allow possible other ways of coupling and/or uncoupling, for example, by means of turning in and/or out and/or by means of a translation movement, whether or not combined with a snap effect. It is clear that the possibility of coupling the floor panels at the sides 2-3 to each other in other manners, too, can be achieved in a simple manner by implementing the coupling parts 4-5 with a suitable configuration. For example, it is clear that the configuration of FIG. 4 allows that such floor panels can be turned out of each other as well as back into each other by means of a turning movement W. They may also be joined by means of a translation P, wherein the right-hand floor panel 1 is shifted towards the left-hand floor panel 1 in a whether or not rectilinear movement.

Figure 5:
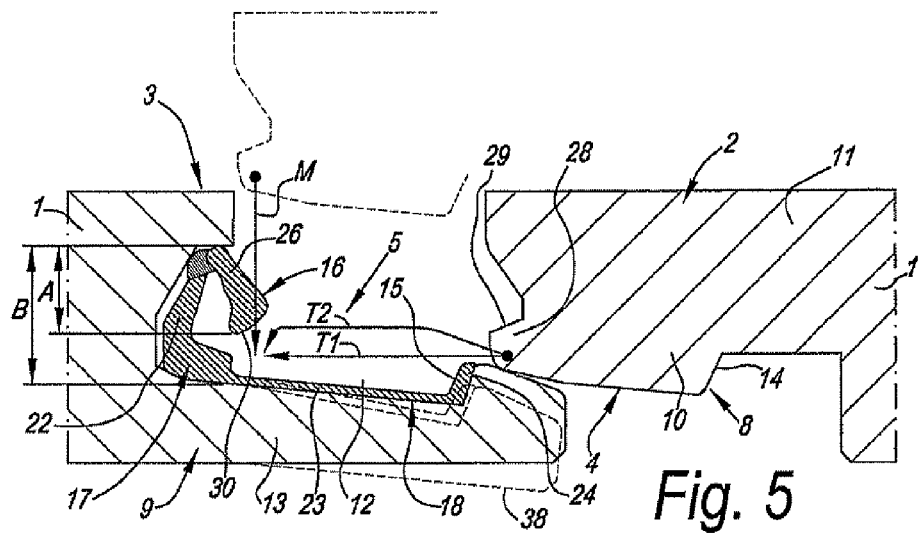
FIG. 5 represents a variant of the embodiment of FIG. 4.

FIG. 5 represents a variant wherein the hook-shaped part 13, contrary to the embodiment of FIG. 4, is made narrower towards its free extremity and thus the bottom part 23 also extends in a somewhat inclined manner. Such narrowed embodiment implies that the floor panels can be easier joined into each other by means of a translation movement.

Herein, two possibilities can occur. When the floor panels 1 are held in the same plane and are moved towards each other in this manner, such as indicated by arrow T1, the hook-shaped part 13 is forced to bend out elastically in downward direction. When the floor panels 1 have been pushed with their upper edges against each other, the lock-up body 26 automatically comes into the locking position, whereas the bent-out hook-shaped part 13 also springs back and becomes seated behind the male part 8. When the floor panel 1 represented at the right hand side is freely movable in height, a movement according to arrow T2 will take place during connecting, wherein the male part 8 arcuately slides over the hook-shaped part 13 in order to finally drop until a locking is obtained. Of course, also combinations of both movements may take place.

It is also clear that the floor panels 1 in the embodiment of FIG. 5 can be coupled and/or uncoupled by means of a turning movement, such due to a suitable height of the hook-shaped part 13 and/or a suitable inclination of the locking surfaces 14 and 15.

In the case of rectangular floor panels, whether oblong or square, it is clear that also at the second pair of opposite sides coupling parts can be provided, which in coupled condition preferably also provide a horizontal as well as a vertical locking. This coupling parts at the second pair of sides may also be performed as a "push-lock" coupling, whether or not in accordance with the present invention. Preferably, however, at the second pair of sides coupling parts will be applied which allow a mutual coupling by means of a turning movement among the two floor panels to be coupled and/or by means of a shifting movement, which results in a snap connection. Such coupling parts are widely known from the state of the art and are described, for example, in WO 97/47834.

Figure 6:
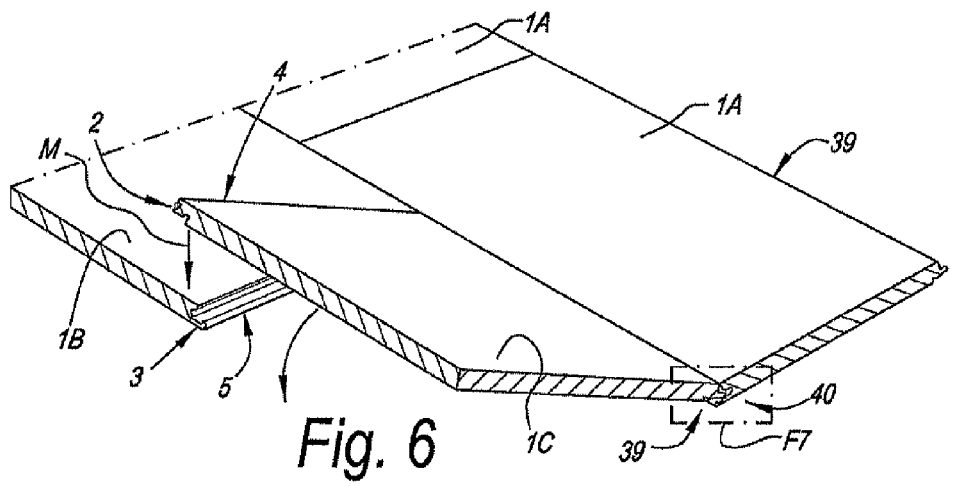
FIG. 6 represents a number of floor panels, which are made in accordance with the invention, during the installation of the floor panels.
Figure 7:
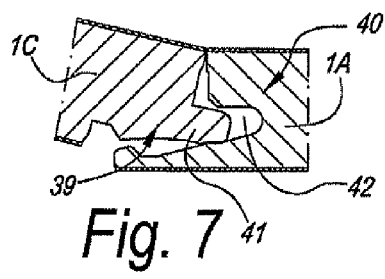
FIG. 7, at a larger scale, represents the portion indicated by F7 in FIG. 6.

In the most preferred embodiment, at the second pair of sides 39-40 coupling parts 41-42 will be applied which allow at least a connection by means of a turning movement, as this allows installing the floor panels in a simple manner, as illustrated in FIGS. 6 and 7. Then a new floor panel 1C to be installed simply can be turned at its side 39 into the preceding row of floor panels 1A, such directly next to a preceding floor panel 1B in the same row. During the turning-down movement, the male part of the new floor panel 1C to be installed then automatically engages in the female part of the preceding floor panel 1B without having to perform another operation. Thus, in the case of oblong floor panels 1, it is preferred that the so-called "push-lock" connection then is situated at the short sides.

Figure 8:
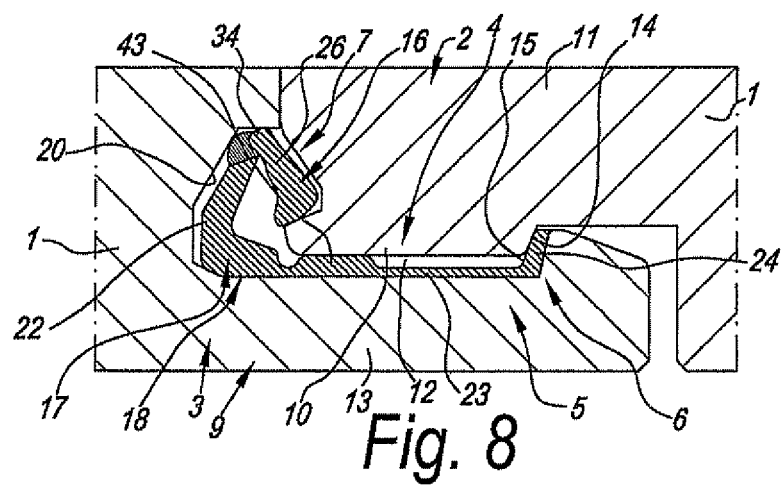

FIG. 8 represents a particular embodiment of the seventh aspect of the invention. The particularity herein consists in that the bottom part 23 is provided with a local support part 43, as a result of which, seen in cross-section, the contact between the lower side of the male part 8 and the bottom part 23 is limited to a small distance, which is clearly smaller than the distance over which the entire bottom part 23 is extending. Such local support part 43 offers the advantage that it can easily be controlled for tolerances during the extrusion of the insertion piece 17, contrary to the fact that the entire bottom part would have to be controlled. Hereby, it is obtained that the position of the upper side of the bottom part, on which the male part rests, can be kept within very precise tolerances, which is important for providing the pressing-on effect provided by means of the locking element 16. It is noted that the local support part 43, as represented, does not necessarily have to be made thicker than the remainder of the bottom part. As a variant, it is in fact also possible to provide a lower-situated portion at the lower side of the male part, which lower-situated portion comes into contact with the bottom part 23 only over a certain distance, wherein at the location of this contact then a precise control of the tolerances has to be provided.

Figure 9:
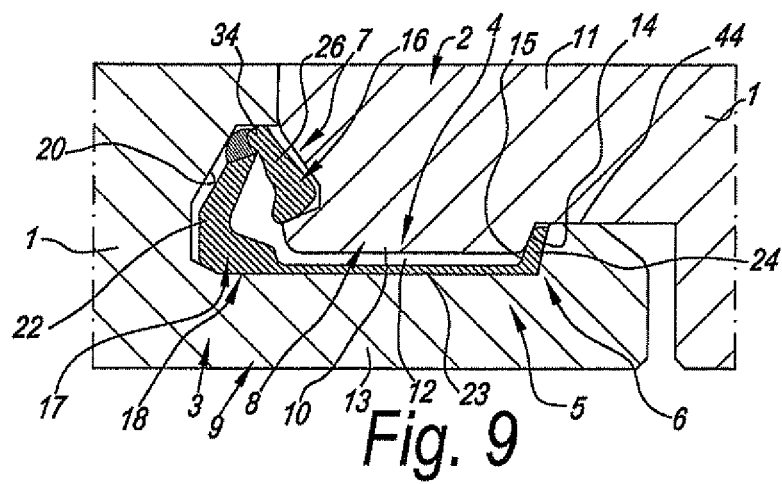

In FIG. 9, an embodiment of the invention is represented, which, amongst others, illustrates the eighth aspect of the invention, with the particularity that the male part 8 in horizontal direction cooperates with the lip-shaped part 24, however, in vertical direction does not rest on the bottom part, but on the contrary a support in downward direction is provided by means of a support point 44, which is active exclusively among the actual basic materials from which the hook-shaped parts 11 and 13 are realized. This has the advantage that the accuracy of the support point 44 does not depend on the correctness with which the thickness of the bottom part 23 is performed.

Figure 10:
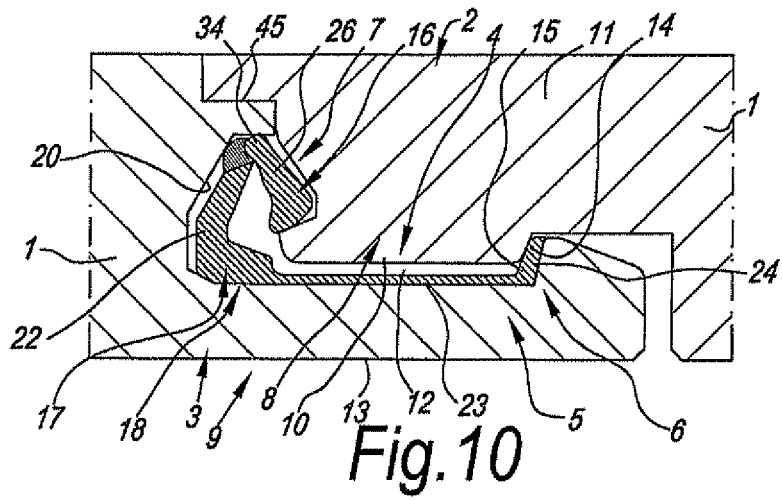

According to FIG. 9, the support point 44 is situated at the end of the hook-shaped part 13. FIG. 10 represents a variant, wherein instead of such support point 44, use is made of a support point 45 in the proximity of the adjoining upper edges of the coupled floor panels 1.

Figure 11:
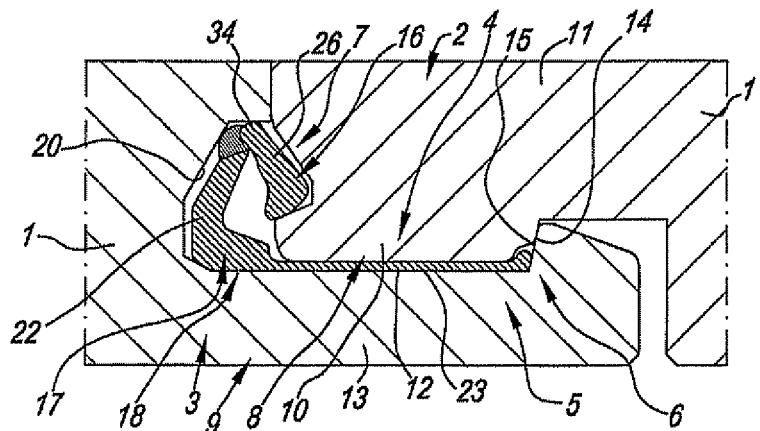

FIG. 11 illustrates, amongst others, the ninth aspect of the invention, such in that the locking surfaces 14 and 14, which provide for the horizontal locking, are realized in the basic material of the floor panels 1, whereas the male part in downward direction indeed is supported on the insertion piece 17, more particularly on the bottom part 23 thereof.

Figure 12:
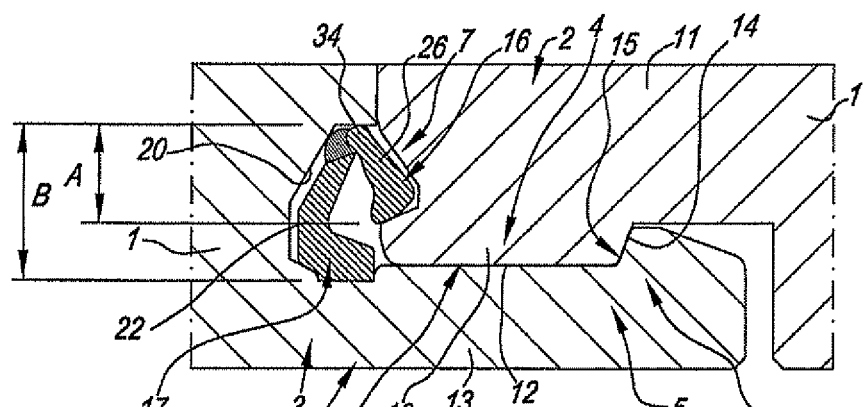

FIG. 12 represents an embodiment, wherein no bottom part 23 and no lip-shaped part 24 are present. Moreover, the construction of the coupling parts 4-5 actually is substantially similar to those of the FIGS. 2, 4 and 8 to 12. The embodiment of FIG. 12 forms an example of the tenth aspect of the invention. In accordance with this tenth aspect, this then relates to a floor panel 1, which, at least at two opposite sides 2-3, comprises coupling parts 4-5 with which two of such floor panels 1 can be coupled to each other; wherein these coupling parts 4-5 form a horizontally active locking system 6 and a vertically active locking system 7; wherein the horizontally active locking system 6 comprises a male part 8 in the form of a downwardly directed projection 10 and a female part 9 with a seat 12 open towards the top, which have horizontally active locking surfaces 14-15; wherein said male part 8 and female part 9 allow that two of such floor panels 1 can be connected to each other at said sides 2-3 by providing one of these floor panels 1 with the pertaining male part 8, by means of a downward movement, in the female part 9 of the other floor panel 1; wherein the vertically active locking system 7 comprises a vertically active locking element 16 in the form of a lock-up body 26 directed downward with a free extremity, which lock-up body forms part of an insertion piece 17 provided in the female part 9; with the particularity that the distance A over which the lock-up body 26 extends in height in the coupled condition, is smaller than the height B of the back part 22, however, is larger than ⅓ of the height B of the back part 22, which yields the advantages mentioned in the introduction.

It is clear that this aspect is applied, amongst others, in the embodiments represented in FIGS. 2, 4, 5 and 8 to 11.

It is noted that the herein above-described embodiments of the FIGS. 2-4, 5 and 8 to 10 also form examples of floor panels meeting the eleventh aspect. Herein, this respectively relates to a floor panel, which, at least at two opposite sides 2-3, comprises coupling parts 4-5 with which two of such floor panels 1 can be coupled to each other; wherein these coupling parts 4-5 form a horizontally active locking system 6 and a vertically active locking system 7; wherein the horizontally active locking system 6 comprises a male part 8 in the form of a downwardly directed projection 10 and a female part 9 with a seat 12 open towards the top, which have horizontally active locking surfaces 14 and 15; wherein said male part 8 and female part 9 allow that two of such floor panels 1 can be connected to each other at said sides 2-3 by providing one of these floor panels 1 with the pertaining male part 8, by means of a downward movement, in the female part 9 of the other floor panel 1; wherein the vertically active locking system 7 comprises a vertically active locking element 16, which forms part of an insertion piece 17 provided in the female part 9; wherein this insertion piece 17, apart from the locking element 16, also comprises at least a bottom part 23 which, in the coupled condition of two of such floor panels 1, is situated at least partially underneath said projection 10, as well as an upwardly directed lip-shaped part 24 forming the horizontally active locking surface 15 pertaining to the female part 9; with the particularity that the coupling parts 5-6 are configured such that two of such floor panels 1 can be turned into each other and/or out of each other by means of a turning movement of the one floor panel 1 in respect to the other floor panel 1. This offers the advantage that the upwardly directed portion, consisting of the core material of the basic material, of the hook-shaped part is less stressed when being turned out, as the lip-shaped portion 24 then offers reinforcement and protection. In order to allow a smooth turning movement and to protect the hook-shaped portion 13 from too large forces during turning out, this construction preferably also shows the advantage that the distance, measured in horizontal direction, between the upper edge of the floor panel 1 at the location of the female part up to the beginning of the locking surface 15, which is situated at said lip-shaped part 24, is larger than the distance, measured in vertical direction, between the upper side of the floor panel 1 and the lower side of the projection 10 of the male part 8.

Figure 13:
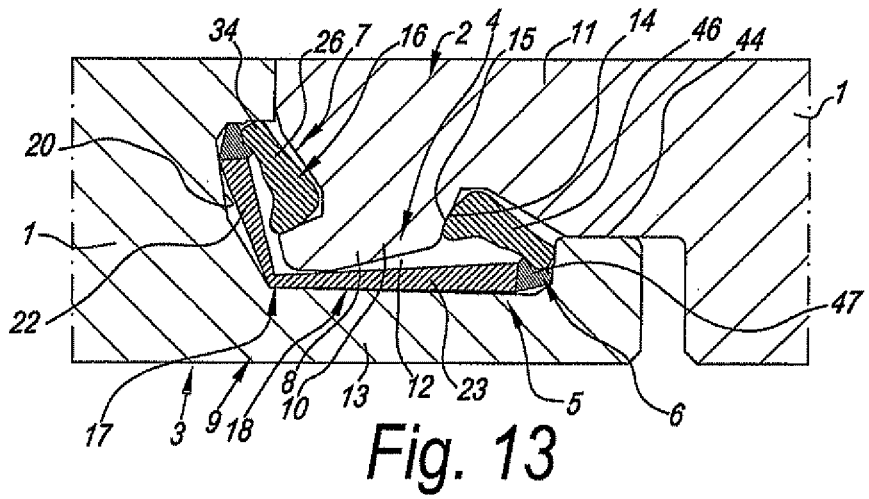

FIGS. 13 and 14 represent two particular embodiments, wherein use is made of an additional lock-up body 46, which provides for the horizontal locking and to this aim is connected to the bottom part 23 by means of a hinge portion 47. Herein, the lock-up portion 46 and the hinge portion 47 can function in a similar manner as the lock-up body 26 and the hinge portion 32. In FIG. 13, also use is made of a support point 44, whereas in the embodiment of FIG. 14 a support point 45 is applied. It is clear that according to variants, such support points 44 and 45 also may be omitted.

FIG. 15 represents an embodiment applying the twelfth aspect of the invention, namely, that locking elements are applied in the form of one or more lips 48 and 49, which as such are elastically bendable. In accordance with the twelfth aspect, this herein relates to floor panels 1, which, at least at two opposite sides 2-3, comprise coupling parts 4-5 with which two of such floor panels can be coupled to each other; wherein these coupling parts 4-5 form a horizontally active locking system 6 and a vertically active locking system 7; wherein these coupling parts 4-5 comprise a male part 8 and a female part 9; wherein said male part 8 and female part 9 allow that two of such floor panels 1 can be connected to each other at said sides 2-3 by providing one of these floor panels 1 with the pertaining male part 8, by means of a downward movement, in the female part 9 of the other floor panel 1; with the particularity that at least one of said locking systems 6-7 makes use of an insertion piece 17 of synthetic material, which is provided with one or more lips 48-49 which as such are deformable, which lips respectively are located laterally on a wall of the insertion 17 piece and which, in the coupled condition of two of such floor panels, thus, in the condition of FIG. 15, due to the fact that they are somewhat bent or impressed, exert a tension force, which presses the coupling parts against one or more well-defined contact surfaces, support points, respectively.

In the example of FIG. 15, the insertion piece 17 is provided in the female part 9 and has a shape which is similar to that of FIG. 4, namely, in that it also has a back part, a bottom part and a lip-shaped part at the height of the locking surface 15. At the location of the locking surface 15, said lips 49, which as such are deformable, are provided, which are situated laterally on the wall of the lip-shaped part of the insertion piece 17 and press the floor panels 1 together next to their upper edge, wherein the upper lateral face of the left-hand floor panel then functions as a well-defined contact surface. At the uppermost end of the back part, there is a portion with a side, in this case, the lower side thereof, at which the deformable lips 48 are provided, which press the male part on the bottom part situated there beneath, which latter then serves as the well-defined contact surface.

According to a preferred characteristic, the lips 48-49 are provided at the insertion piece 17 by means of extrusion and then consist, for example, of a suppler material.

In the example, these lips 48-49 are applied for the vertical as well as for the horizontal locking, however, it is clear that according to not-represented variants they might also be applied exclusively for a vertical locking or a horizontal locking. It is also clear that according to variants, they might also be provided on other locations.

As represented, the lips preferably are realized, so to speak, as micro lips, by which here is meant that they have small dimensions in relation to the remainder of the insertion piece 17. More particularly, such lip then preferably will protrude from the lateral face concerned only over a distance of less than 2 mm and still better of less than 1 mm.

Similar to the example, preferably use is made of series of lips 48-49. Instead of such series of lips 48 or 49, use may also be made of respectively only one lip.

Preferably, the lips 48-49 protrude farther than they are wide. However, according to a variant, such lips also may be implemented as small ridges, which exclusively are impressible. Thus, the term "lip" has to be interpreted in a broad sense.

FIG. 16 shows coupled floor panels, which form an example of the thirteenth aspect of the invention. To this aim, this relates to floor panels, which, at least at two opposite sides 2-3, comprise coupling parts 4-5 with which two of such floor panels can be coupled to each other; wherein these coupling parts 4-5 form a horizontally active locking system 6 and a vertically active locking system 7; wherein the horizontally active locking system 6 comprises a male part 8 and a female part 9, which allow that two of such floor panels 1 can be connected to each other at said sides 2-3 by providing one of these floor panels 1 with the pertaining male part 8, by means of a downward movement, in the female part 9 of the other floor panel 1; wherein the vertically active locking system 7 comprises a locking element, which forms part of an insertion piece 17 provided in one of the respective sides; and wherein this locking element comprises at least a pivotable lock-up body 26; with the particularity that the lock-up body 26, by means of a hinge portion 32 preferably formed of a material portion 33 consisting of a material which is more supple than the material from which the lock-up body 26 is formed, is connected to a basic part 50 pertaining to the insertion piece 17, which preferably is provided in a recess 51, wherein the pivotable lock-up body 26 and the basic part 50 are provided with surfaces 52 and 53, which, when the lock-up body 26 is pivoted inwards, form guiding surfaces for each other and thereby determine the movement of the lock-up body 26. In this manner, a better controlled movement of the lock-up body is possible.

Figure 17:
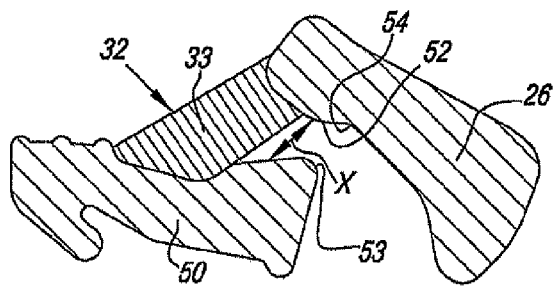
FIG. 17 represents the insertion piece of FIG. 16 as such and in free condition.

The associated insertion piece 17 is depicted in FIG. 17 at a larger scale. The hinge portion 32 consists of an elastic material, which, as will be discussed hereinafter, provides for that the lock-up body 26 provides for the necessary snap action when joining the floor panels 1 together. The insertion piece 17 preferably is formed by means of coextrusion, wherein the lock-up body 26 and the basic part 50 consist of a material which, in relation, is not very supple. Herein, the insertion piece 17, as represented, preferably is configured such that in the free condition a relatively reasonable distance X is present between the basic part 50 and the lock-up body 26, said distance being bridged over by the material portion 33. This offers the advantage that the material portion 33 is relatively long, for example, in comparison to the material portion 33 of FIG. 3, whereby it can be well extended in its longitudinal direction. Another advantage of the distance X consists in that the thereby created space between the basic part 50 and the lock-up body 26 is more advantageous in the coextrusion process, as providing the necessary mold walls in between them becomes easier and a better control of tolerances is possible.

Figure 18:
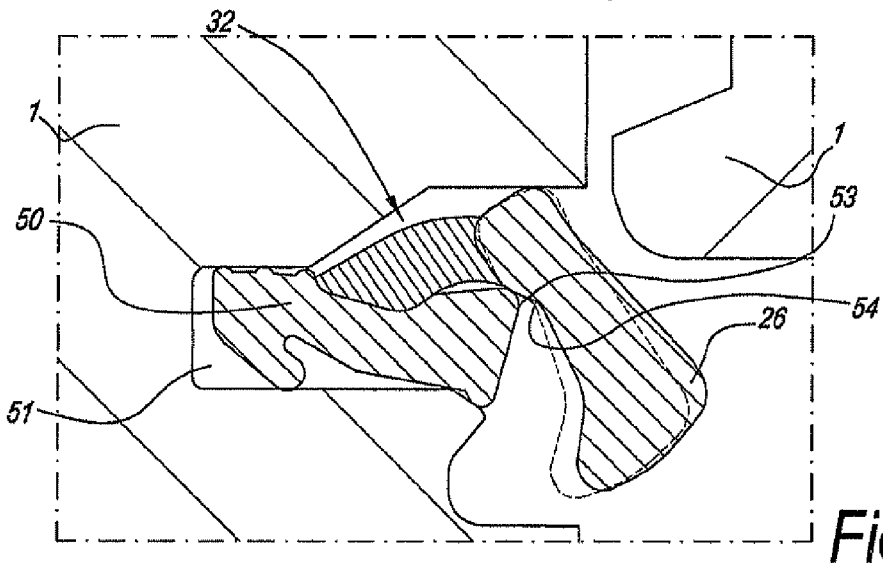
FIGS. 18 to 20 represent different positions during the joining of the floor panels of FIG. 16.
Figure 19:
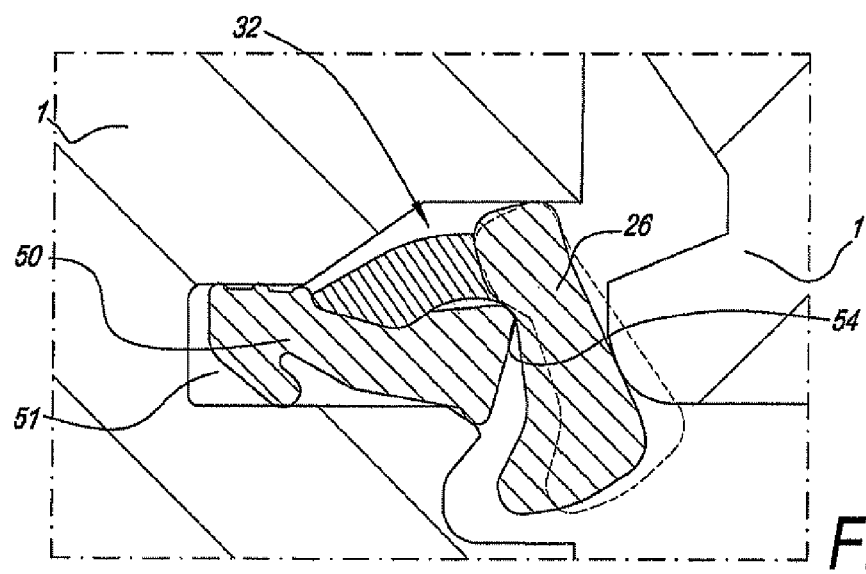
Figure 20:
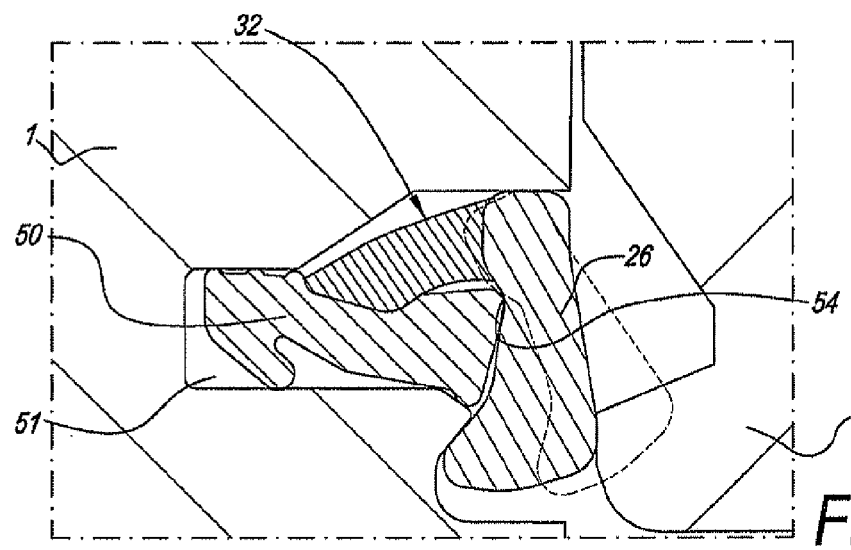

The functioning of the coupling parts 4-5 is represented in different steps in FIGS. 18 to 20. In the free condition, the insertion piece 17 is in the position of FIG. 18, wherein the hinge portion 32 is slightly bent and somewhat stretched. Herein, the surfaces 52 and 53 possibly may already be in contact with each other, and the lock-up body 26 is situated with its extremity against the support surface situated there above.

By subsequently letting the panel with the male part down, the lock-up body 26 in a first phase is pivoted inward up into the position of FIG. 19. Herein, the lock-up body 26 performs a sliding movement along the surface 53 with its surface 52.

In the position of FIG. 19, the lock-up body 26 comes to sit with a corner 54 provided for this purpose against the surface 53, as a result of which said sliding movement substantially is terminated, with the consequence that further impressing the lock-up body 26 substantially results in a rotation around said surface 53, more particularly of the inner corner 54 around the opposed outer corner at the basic part 50. This has as a result that, as represented in FIG. 20, a larger extension takes place in the hinge portion 32, as a result of which a larger tensioning force is realized, which then in its turn results in that, when the floor panels 1 have been brought up into the same plane, the pivotable lock-up body 26 suddenly will move outward with its free extremity with a large force, which is beneficial for a good snap action. It is clear that in this manner, so to speak, a two-stage effect can be provided, wherein the lock-up body 26 in a first phase can be impressed smoothly and only towards the end needs to be impressed with a larger force. This offers the advantage that the floor panels, on the one hand, are easily to be joined, whereas, on the other hand, at the end of the joining movement, it is guaranteed with high certainty that the lock-up body 26 attains its locking position.

Herein, it is also important that the lock-up body 26, due to the cooperation of the surfaces 52 and 53, is forced to perform a predetermined movement, as a result of which a precise functioning is obtained.

It is clear that embodiments which are implemented according to the thirteenth aspect of the invention, are intended in particular for making use of a pivotable lock-up body 26, which turns against a support surface.

It is noted that according to the thirteenth aspect of the invention, it is not excluded to provide the insertion piece 17 at another location in the respective sides 2-3, for example, at the male part instead of at the female part.

Figure 21:
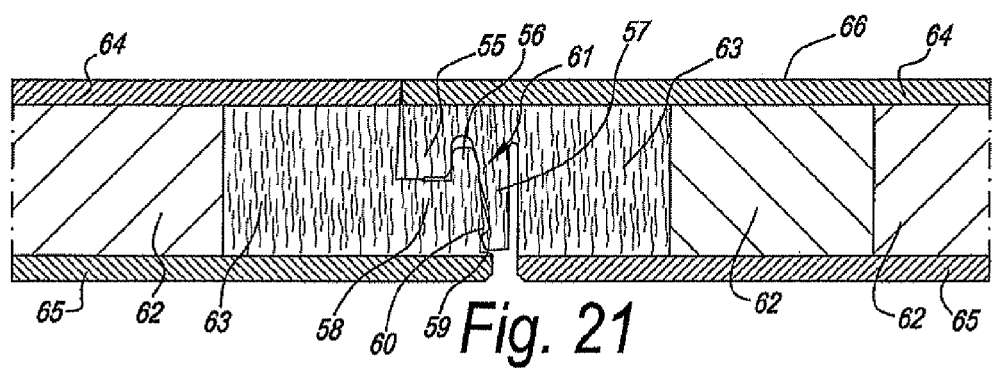
FIG. 21, in cross-section, represents another particular embodiment of coupled floor panels according to the invention.

Finally, in FIG. 21 a coupling of floor panels is represented, wherein these floor panels are realized in accordance with said seventeenth aspect. As represented, herein then floor panels are concerned, which, at least at two opposite sides, comprise coupling parts with which two of such floor panels 1 can be coupled to each other; wherein these coupling parts form a horizontally active locking system and a vertically active locking system, which allow that two of such floor panels 1 can be connected to each other at said sides by providing one of these floor panels, by means of a downward movement, in the other floor panel, with the particularity that the vertically active locking system comprises locking parts 59-60 engaging one after the other, of which at least one locking part, in this case, the locking part 60, is situated on a lip-shaped bendable part 57, which extends in the height, and that at least said bendable part 57 consists of a pressed fiber material, said material showing a predominant fiber direction and/or predominant fiber planes 61, wherein this fiber material is positioned such that the predominant fiber direction and/or predominant fiber planes 61 also extend in the height. As the predominant direction of the fibers or fiber planes then substantially coincides with the direction of the part 57, the advantage is obtained that this part, on the one hand, is smoothly bendable and, on the other hand, can be made relatively thin in transverse direction, thus, in this case in horizontal direction, without it breaking off under the influence of slide-off forces.

In this manner, a new possibility is created for realizing so-called push-lock systems, for example, in wood-based fiber material.

According to a preferred embodiment, for the material of which the coupling parts are formed, thus use shall be made of MDF (Medium Density Fiberboard) or HDF (High Density Fiberboard).

FIG. 21 also shows that the seventeenth aspect is particularly suited for being employed in the manufacture of so-called prefabricated parquet or so-called "engineered wood", wherein the core of the floor panels mostly is composed of lamellae or small laths 62-63, and the lamellae 63, in which the coupling parts then have to be realized, can be formed of MDF or HDF laths. The MDF or HDF laths then can be realized from a relatively thick MDF or HDF board, wherein the laths obtained therefrom then, so to speak, are positioned on their side in order to obtain that the predominant fiber direction then extends in the height.

In the case of an application in engineered wood, as represented in FIG. 21, it is clear that preferably first a board is composed of the lamellae 62-63, a top layer 64 of a better wood quality, and a backing layer 65, and that thereafter the respective coupling parts are formed in the lamellae 63, for example, by means of a milling treatment.

It is evident that the coupling parts represented in FIG. 21 in principle may be provided on both pairs of sides or rectangular or square panels. Preferably, however, at one pair of sides a coupling system will be provided which allows joining by means of turning, whereas then at the other pair of sides the coupling of the seventeenth aspect is applied, in such a manner that an installation technique can be applied similar to that of FIG. 6.

Figure 22:
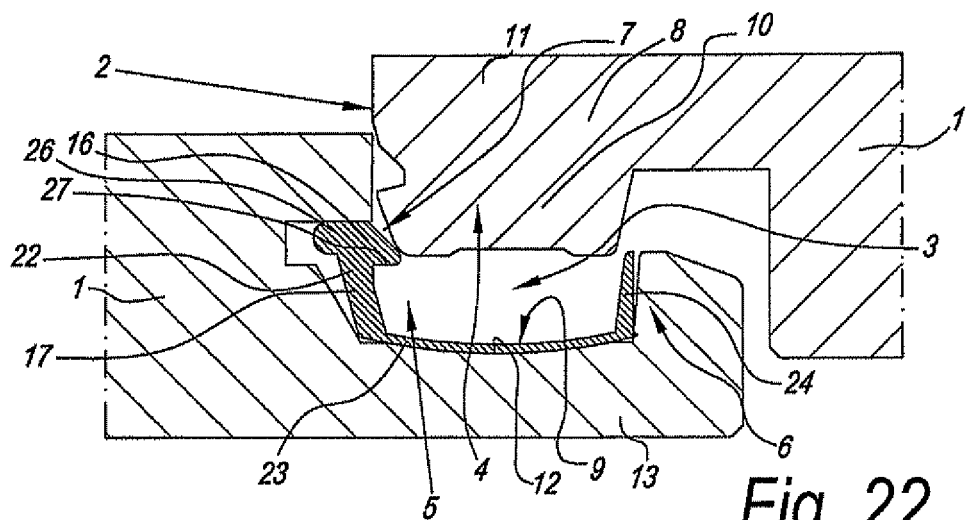
FIGS. 22 to 24, in a view similar to that of FIG. 4, represent another embodiment of the invention.

FIG. 22 represents a floor panel 1 with, amongst others, the characteristics of the fourteenth aspect. Herein, the vertically active locking system 7 comprises a vertically active locking element 16 which forms part of an insertion piece 17 which is provided in the female part 9. The insertion piece shows a bottom part 23, which, in the example, is situated in a seat 12 of the female part 9, said seat being open towards the top. Moreover, the insertion piece 17 of the example shows an upwardly directed lip-shaped part 24, which, in this case, forms the horizontally active locking surface 15 pertaining to the female part 9. Herein, said lip-shaped part 24 is made single-walled. It is clear that the example represented here also shows the characteristics of the fifth and sixth aspect mentioned in the introduction. To those skilled in the art, it is clear that the embodiment represented here can also be adapted such that it shows the characteristics of one or more of the other aspects mentioned in the introduction.

Figure 23:
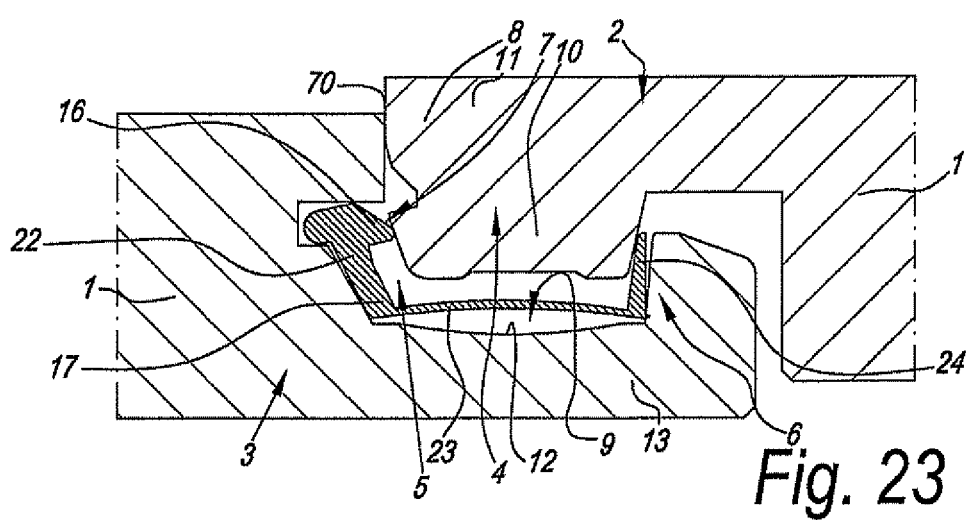

FIG. 23 shows that said bottom part 23 is deformed during the downward movement M. In this case, the bottom part 23 is tensioned like a leaf spring in that the male coupling part 8, or the downwardly directed projection 10, forces the insertion piece 17 open. To this aim, the downwardly directed projection 10 during the downward movement M comes into contact with said locking element 16 as well as with the upwardly directed lip-shaped part 24, which is made integrally with the insertion piece 17, wherein a bending of the bottom part 23 is created. This bending is accompanied by an accumulation of mechanical energy in said bottom part 23.

Towards the end of the downward movement M, this is in the case when the male coupling part 8 comes into such a position that the vertically active locking element 16 can engage in the downwardly directed projection 10, the bottom part 23 relaxes and supplies the energy required for said engagement. As a consequence thereof, the locking element 16 comes into a position in which it provides for the vertical locking of the coupled floor panels 1.

Figure 24:
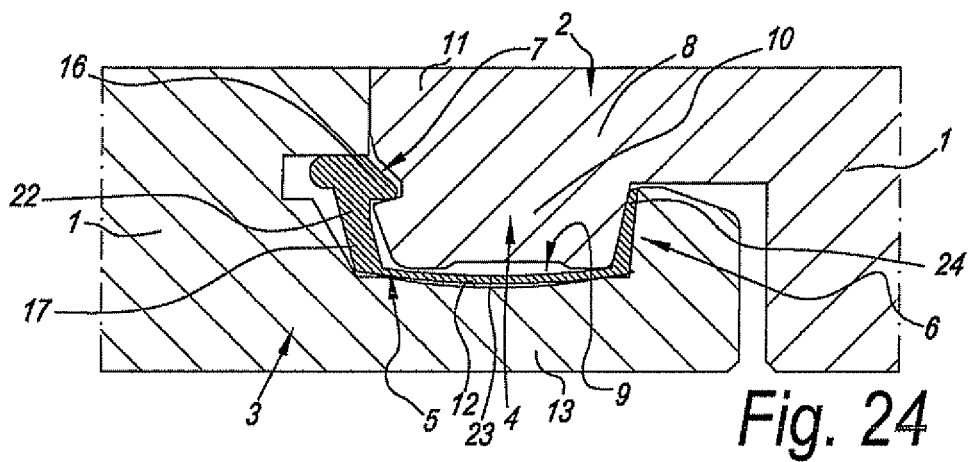

FIG. 24 represents the coupled condition of these floor panels 1. From this example, it is clear that the bottom part 23 is only partially relaxed. Thereby, a very strong locking is obtained in vertical as well as in horizontal directions.

Figure 25:
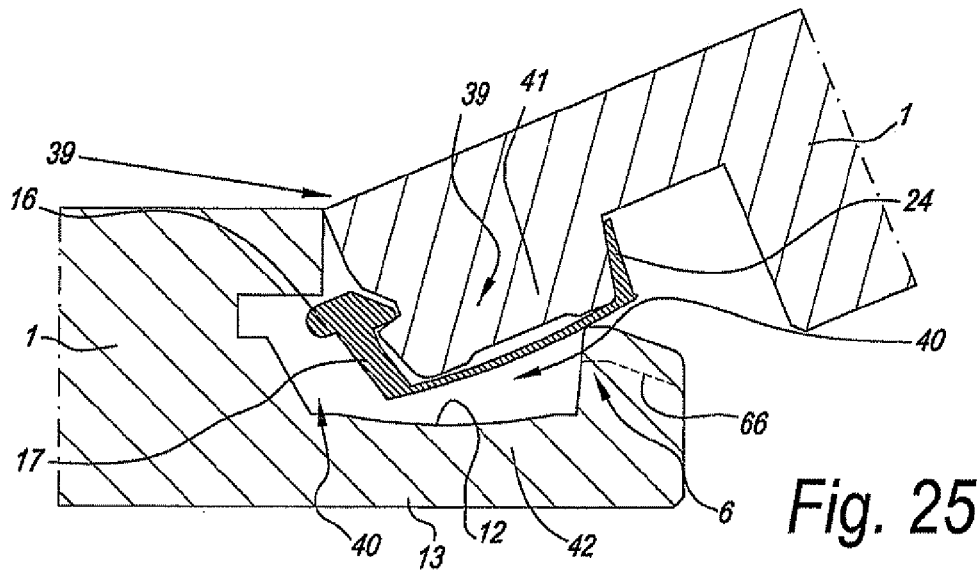
FIG. 25 represents an embodiment with, amongst others, the characteristics of the fifteenth aspect.

FIG. 25 represents that it is possible to provide floor panels 1 at a second pair of opposite sides 39-40 with similar coupling parts and insertion pieces as at a first pair of opposite sides 2-3, wherein an embodiment with the characteristics of the fifteenth aspect of the invention can be obtained. Herein, the floor panels 1 can be connected to each other at the second pair of opposite sides 39-40 by providing one of these floor panels 1 with the pertaining male coupling part 41, by means of a turning movement around the respective sides 39-40, in the female coupling part 42 of the other floor panel 1. The particularity of the embodiment of FIG. 25 is that the horizontally active locking system comprises a vertically active locking element at this second pair of sides 39-40, too, which locking element forms part of an insertion piece 17. Herein, the insertion piece is located at the male coupling part 41. It is clear that for the first pair of sides 2-3, for example, the coupling parts 8-9 and insertion pieces 17 of FIG. 24 can be applied. Of course, an embodiment with the characteristics of the fifteenth aspect can also be obtained by means of other coupling parts 8-9-41-42 and insertion pieces 17. Preferably, the insertion pieces 17 in fact, such as here, are made identical or almost identical. Preferably, also the male coupling part 8-41 and female coupling part 9-42 of both pairs of sides are made identical or almost identical. FIG. 25 represents, in dashed line 66, another variant wherein the female coupling part 42 at the second pair of sides is made different, however, almost identical, in that the upwardly directed hook-shaped part 13 thereof is limited in height. Such adaptation facilitates coupling by means of a turning movement.

Figure 26:
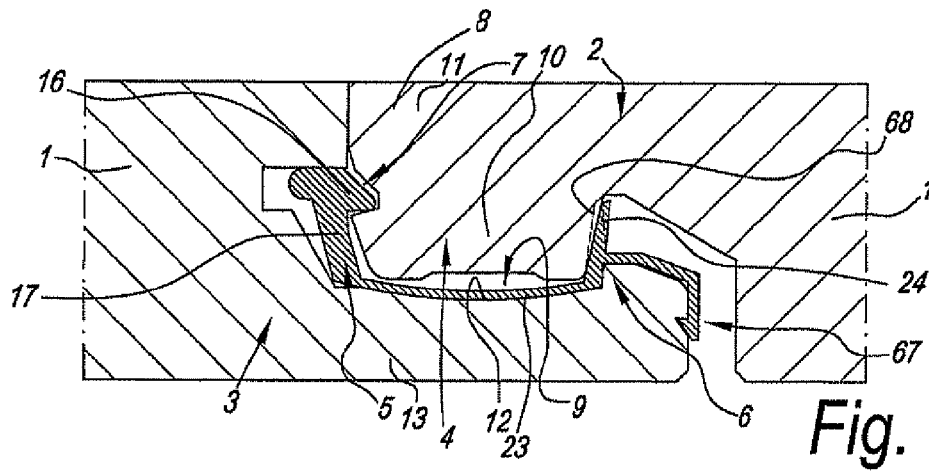
FIGS. 26 to 29, in a view similar to that of FIG. 22, represent variants.

FIG. 26 represents a variant with, amongst others, the characteristics of said fourteenth aspect, wherein the insertion piece 17 shows mechanical attachment means 67 integrally made therewith, which provide for that this insertion piece 17 is connected to the female coupling part 9 in vertical and/or horizontal direction. In the example, the attachment means 67 cooperate with the distal extremity of the female coupling part 9. In dashed line 68, in FIG. 26 also the insertion piece 17 is represented when it is completely relaxed. From this, it is obvious that in the represented coupled condition of both floor panels a pressure force is active between the insertion piece 17, more particularly the lip-shaped part 24 thereof, and the male coupling part 8, wherein this pressure force is operative in a direction which tries to press the floor panels 1 towards each other.

Figure 27:
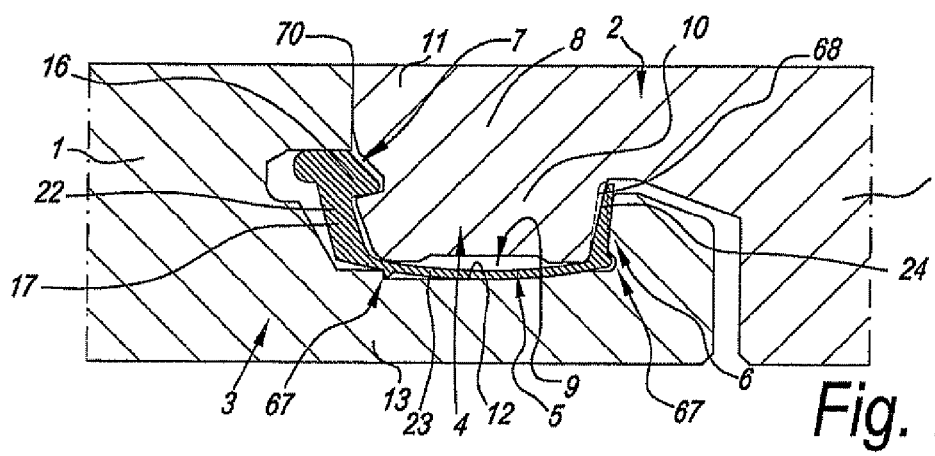

FIG. 27 represents a variant for the mechanical attachment means 67. Herein, the attachment means 67 present on the insertion piece 17 cooperate with recesses which, in this case, are provided locally in the seat 12, which is open towards the top, of the female coupling part 9.

Figure 28:
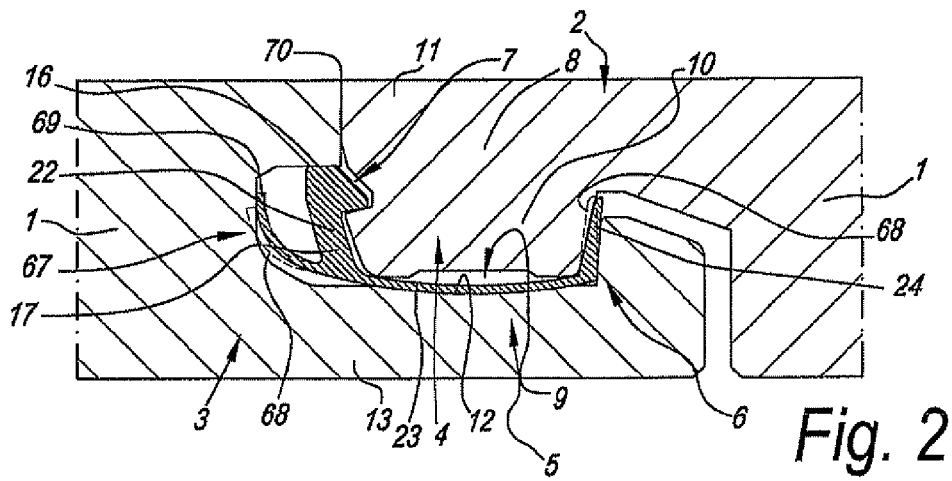

In the example of FIG. 28, the mechanical attachment means 67 comprise a bendable lip-shaped portion 69, which is integrally made with the insertion piece 17 and, in respect to the female coupling part 9, is situated proximally to the locking element 17. Said lip-shaped portion 69 actively tensions the insertion piece 17 in the seat 12, which is open towards the top, of the female coupling part 9.

Figure 29:
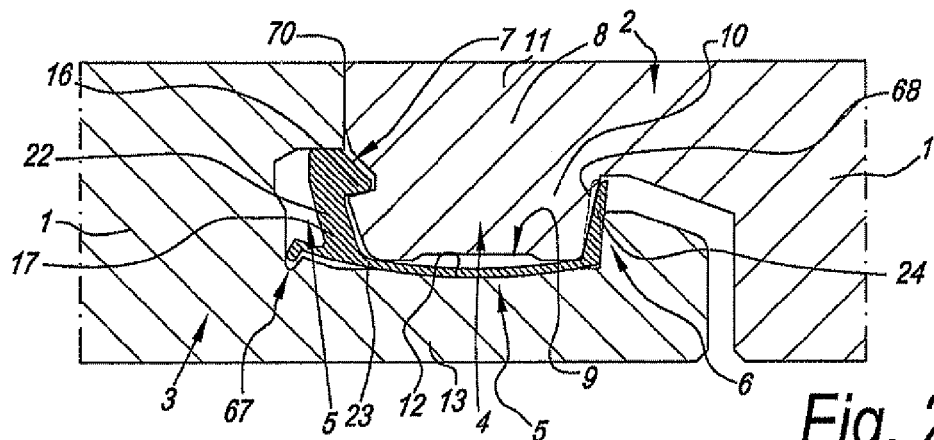

In the example of FIG. 29, the mechanical attachment means 67 again are made integrally with the insertion piece 17 and, in respect to the female coupling part 9, are situated proximally from the locking element 17. Herein, the integrally made mechanical attachment means 67 cooperate with a recess locally provided in the upwardly directed hook-shaped part 13 of the female coupling part 9.

It is clear that such attachment means 67, such as in the FIGS. 26 to 29, also can be applied in the remaining insertion pieces 17 of the present invention according to its first through sixteenth aspect. Further, it is clear that such pressure force, as discussed by means of FIG. 26, can also be active in the other insertion pieces 17 of the present invention. Moreover, it can be combined with a downward pressure force of the vertically active locking element 16 on the male coupling part 8.

Figure 30:
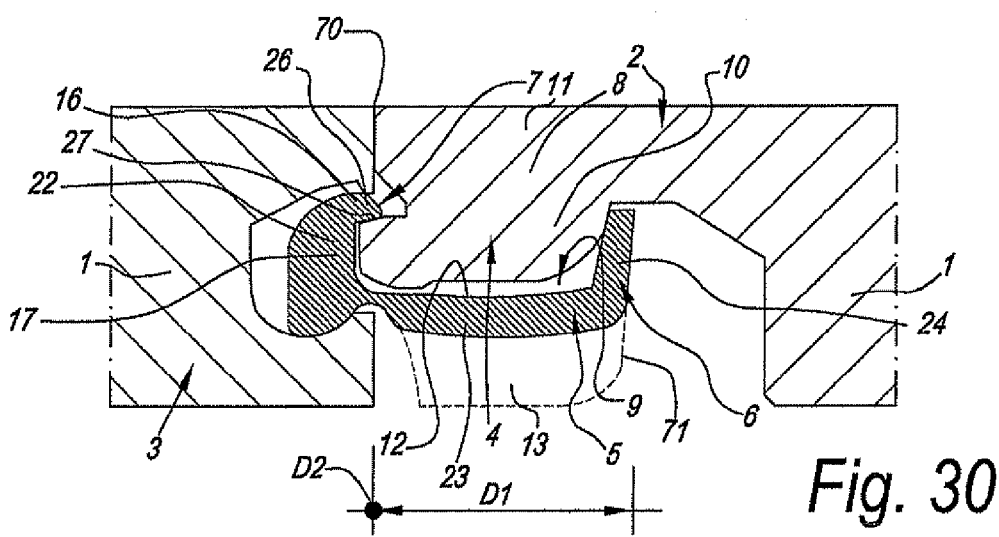
FIGS. 30 to 34 represent another embodiment with, amongst others, the characteristics of the sixteenth aspect of the invention.

FIG. 30 represents an embodiment with, amongst others, the characteristics of the sixteenth aspect of the invention. Herein, the vertically active locking system 7 comprises a vertically active locking element 16, which is integrally made with an insertion piece 17 forming a portion of the female coupling part 9. This insertion piece 17, apart from said locking element 16, also comprises a bottom part 23, which, in this case, forms the seat 12, which is open towards the top, of the female coupling part 9 and which, in coupled condition of two of such floor panels 1, is situated at least partially underneath the downwardly directed projection 10 of the male coupling part 8. A particularity of this embodiment is also that the insertion piece 10 protrudes in horizontal direction up to beyond the upper edge 70 of the respective floor panel 1. Moreover, the distance D1, over which this insertion piece 17 protrudes in this case, is larger than the possible distance D2 over which the portion of the female coupling part 9, which is integrally made with the floor panel 1, protrudes up to beyond this upper edge 70. It is clear that in this example the last-mentioned distance D2 is nonexistent or virtually nonexistent.

In dashed line 71, a variant is represented, wherein the insertion piece 17 is supported over substantially the entire distance D1; in this case, this is realized by realizing the insertion piece 17 such that it itself rests on the underlying layer of the floor covering.

Figure 31:
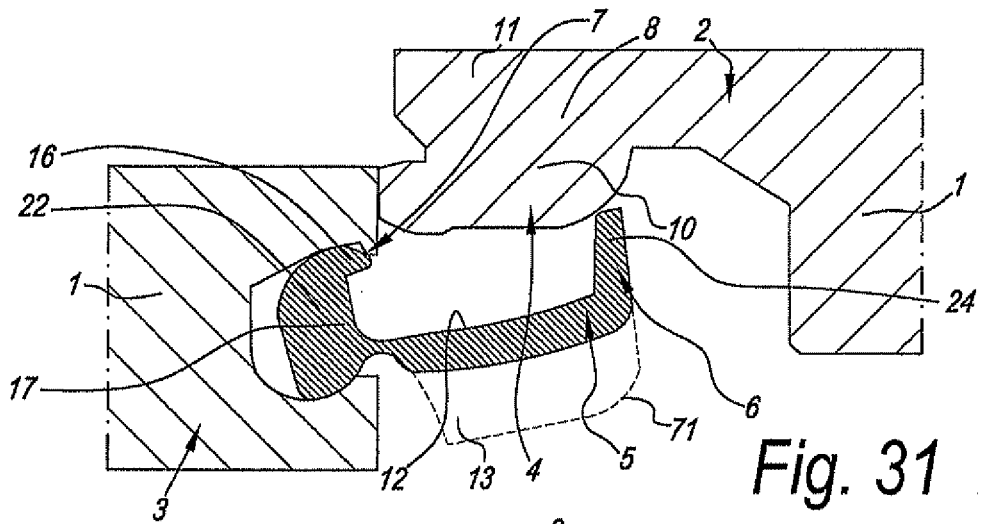
Figure 32:
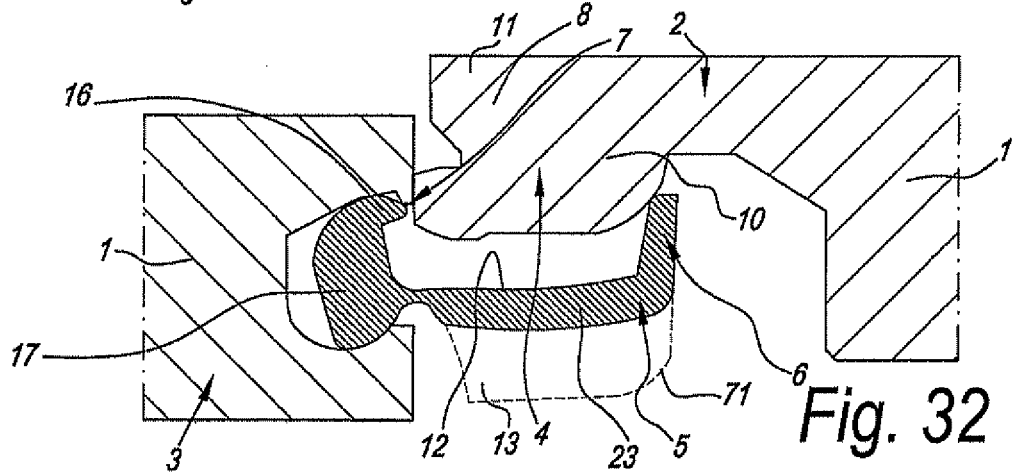
Figure 33:
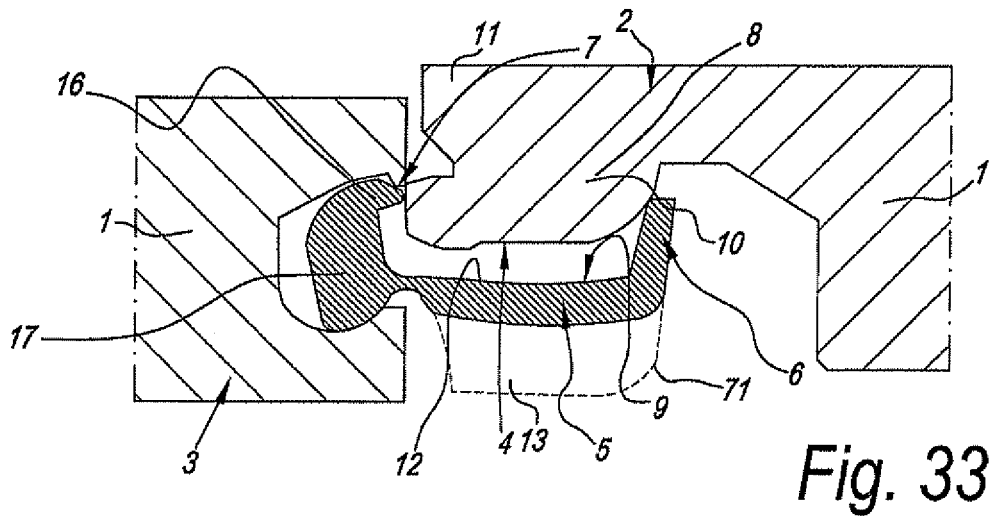

FIG. 31 shows that it is possible that said insertion piece 17 initially is in a tilted position in respect to its final position in the coupled condition represented in FIG. 30.

Figure 34:
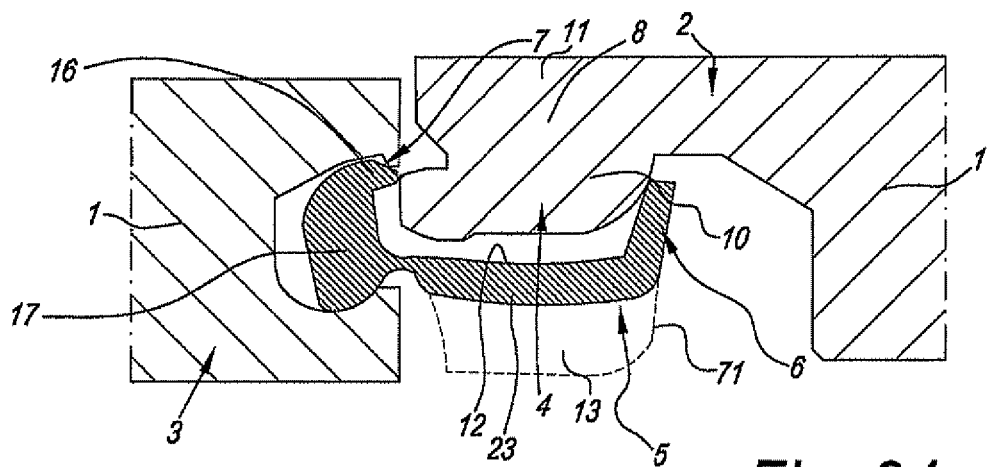

The sequence of FIGS. 31 to 34 makes clear that this insertion piece 17 then is gradually brought into its final position by means of the downward movement M performed by the male coupling part 8. As is evident from the figures, this embodiment also shows the characteristics of the also above-mentioned fourteenth aspect of the invention. FIG. 34 shows that the vertically active locking element 16, towards the end of the downward movement M, engages at the male coupling part 9 by means of the energy delivered by the temporary deformation of the bottom part 23.

Figure 35:
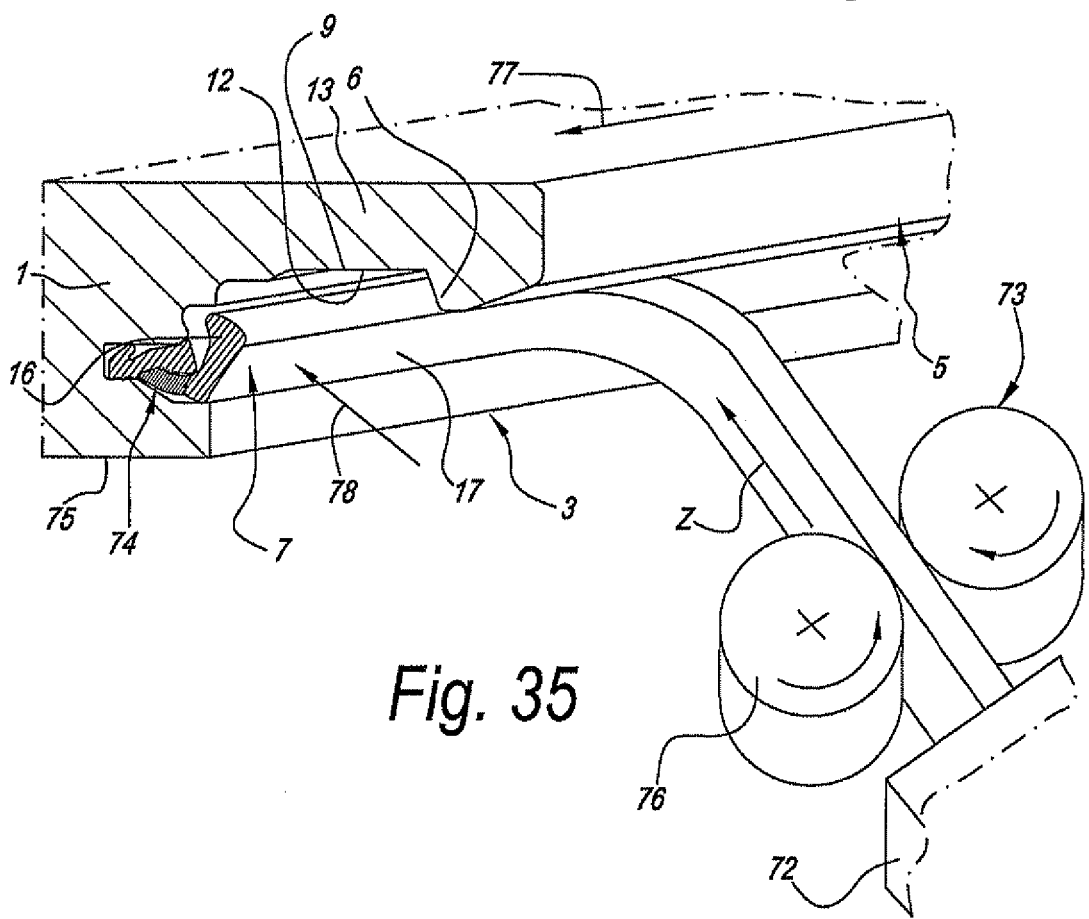

FIG. 35 schematically represents a step in a method for manufacturing floor panels 1. Herein, this relates to a method which as such forms a particular independent aspect of the present invention, wherein this method is applied for manufacturing floor panels 1, which, at least at two opposite sides 2-3, comprise coupling parts 4-5, wherein these coupling parts 4-5 form a horizontally active locking system 6 and a vertically active locking system 7, wherein the vertical and/or the horizontal locking system comprise a locking element, for example, a vertically active locking element 16, which forms part of an insertion piece 17, with the characteristic that said insertion piece 17 is supplied from a magazine 72, for example, from a roll, to the respective side 3 by means of a drive 73, wherein the insertion piece 17, at least for a portion of the path of said drive 73 up into its final position 74, moves in a direction Z perpendicular to the surface 75 of the floor panel 1 concerned. In the example represented here, an insertion piece 17 is applied which is similar to the insertion piece 17 of FIGS. 16 to 20. However, it is clear that such method can also be applied with other insertion pieces 17, such as with the other insertion pieces according to the invention, or such as with the insertion pieces of WO 2009/066153. The inventor has found that the method of the particular independent aspect can lead to a particularly smooth assembly of coupling parts with insertion pieces.

The drive represented in FIG. 35 relates to a drive by means of wheels 76. Of course, other drive systems are possible, such as a drive by means of an air duct. In the example of FIG. 35, the floor panel which is being provided with the insertion piece 17, performs a continuous movement in a direction parallel to the respective side, such as indicated by arrow 77.

As represented, said insertion piece 17 also performs a bending over a portion of said path, whereby this insertion piece 17 finally is aligned in a direction parallel to the respective side. In this position, the insertion piece 17 then can be pressed into its final position 74, as indicated by arrow 78.

Preferably, the insertion piece 17 is shortened to the dimension of the respective side 3 or approximately to the dimension of the side 3 in which it is provided. Preferably, the associated cutting or shortening treatment is performed while the insertion piece 17 already is in its final position. Of course, other possibilities are not excluded. For example, the insertion piece 17 may be supplied in appropriate lengths by means of the drive 73.

It is noted that the method according to the particular independent aspect is particularly interesting for applying insertion pieces 17 which consist of an extruded synthetic material strip. These synthetic material strips can be made so flexible that the distance between the drive 73 and the final position 74 of the insertion piece 17 can be restricted.

Further, it is clear that such method is particularly interesting when manufacturing floor panels which, at least at two opposite sides, are provided with coupling parts which allow that two of such floor panels can be coupled to each other by means of a downward movement, or, in other words, in so-called "push-lock" systems.

Figure 36:
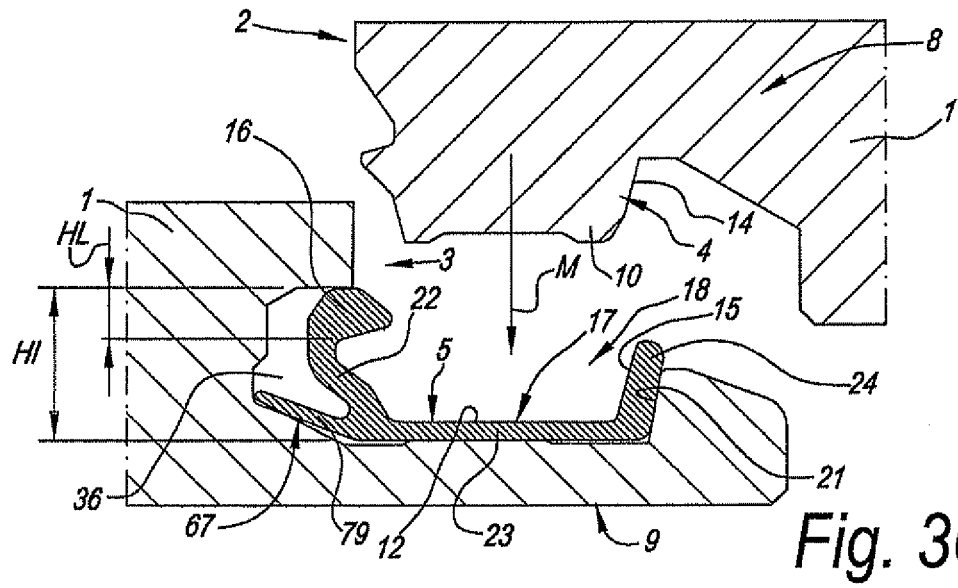
FIGS. 36 and 37 represent two more embodiments of the invention.

In FIG. 36, another variant of the embodiment of FIG. 29 is represented, wherein the insertion piece 17 is realized somewhat different. In this case, the attachment means 67 comprise a substantially straight leg 79. Herein, the insertion piece 17 is prevented to move laterally, or at least is restricted in its lateral movement, on the one hand, in that the free extremity of the leg 79 contacts the wall of the cavity 36 and, on the other hand, in that the lip-shaped part 24 rests against the wall 21. The back part 22 is made in the form of a gooseneck, by which it can be more smoothly moved elastically backward.

Figure 37:
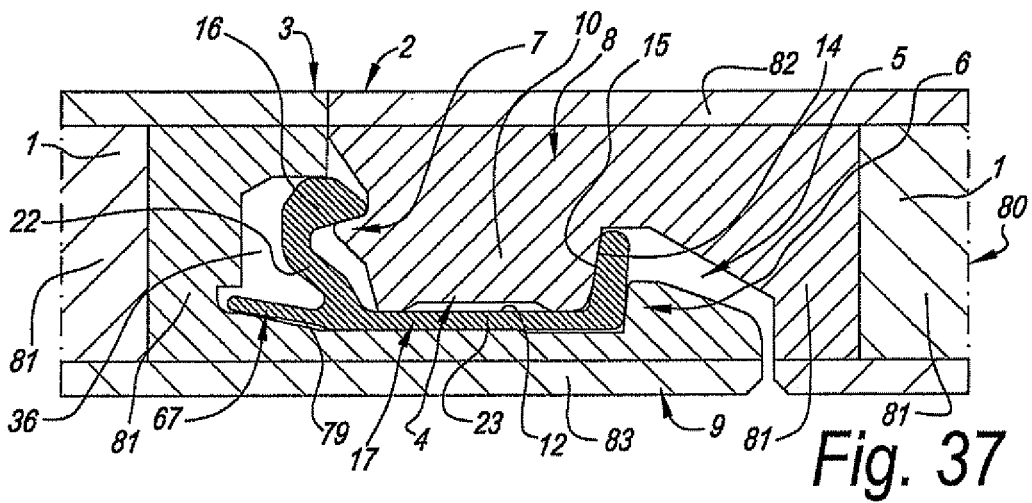

In FIG. 36, the floor panels 1, with the exception of the insertion piece 17, schematically are represented monolithically. However, it is clear that all embodiments described herein above, as well as all embodiments described herein below in practice are applicable in monolithic or as substantially monolithic, as well as non-monolithic floor panels. Monolithic embodiments are those in which the floor panels substantially each are realized from one continuous board, for example, a MDF or HDF board, from which thus the coupling parts 4-5, with the exception of the insertion piece 17, are realized in one piece. A typical example thereof is a laminate floor panel of MDF or HDF, which is treated with melamine or is provided with another thin top layer, for example, a print and/or lacquer. An example of a non-monolithic floor panel is represented in FIG. 37. In this example, this relates to a so-called "engineered wood" panel, which, as is known, consists of a core 80, which is composed of a plurality of parts, such as transversely directed small laths 81. At the upper side of the core, a top layer 82 of hardwood or the like is provided, whereas a backing layer 83 is present at the underside. The outermost laths, in which the coupling parts 4-5 are realized, may consist of another material than the remaining laths 81. The outermost laths consist, for example, of MDF or HDF, whereas the other laths 81 consist of a cheap wood species.

Figure 38:
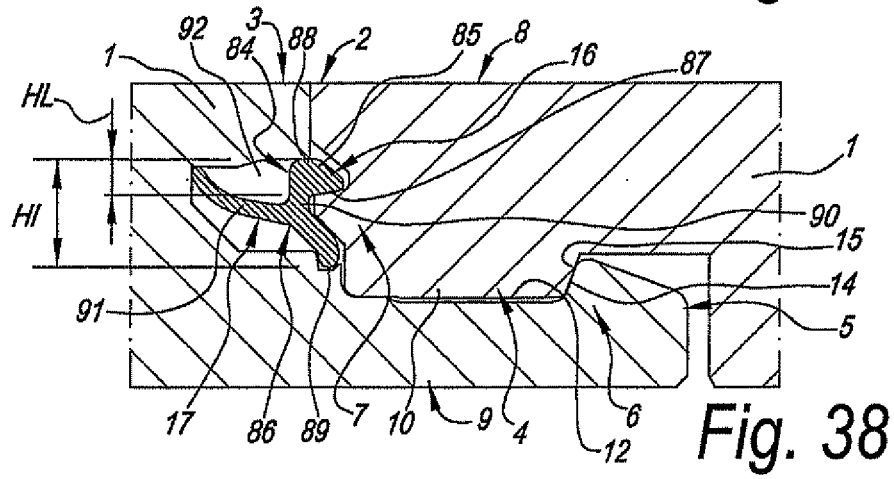
FIG. 38 represents another embodiment according to the invention.
Figure 39:
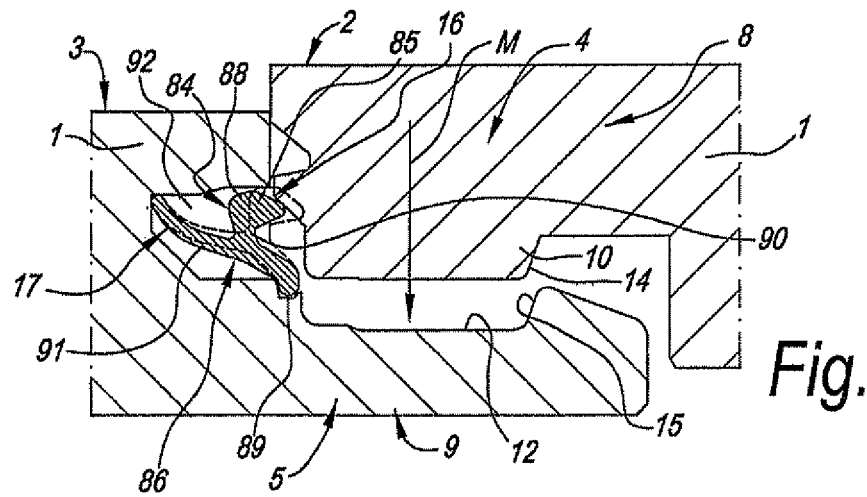
FIG. 39 represents the embodiment of FIG. 38 during the joining together of the panels.

In FIGS. 38 and 39, the edges of coupled floor panels 1 are represented, which specifically apply the eighteenth and nineteenth aspect of the invention.

In accordance with the eighteenth aspect, this herein relates to a floor panel, which, at least at two opposite sides 2-3, comprises coupling parts 4-5 with which two of such floor panels 1 can be coupled to each other; wherein these coupling parts 4-5 form a horizontally active locking system 6 and a vertically active locking system 7; wherein the horizontally active locking system 6 comprises a male part 8 in the form of a downwardly directed projection 10 and a female part 9 with a seat 12 open towards the top, which have horizontally active locking surfaces 14-15; wherein said male part 8 and female part 9 allow that two of such floor panels 1 can be connected to each other at said sides 2-3 by providing one of these floor panels 1 with the pertaining male part 8, by means of a downward movement M, in the female part 9 of the other floor panel 1; wherein the vertically active locking system 7 comprises a vertically active locking element 16, which forms part of an insertion piece 17 which is provided at one of said two sides; and wherein the locking element 16 is of the type which, during said downward movement, performs a lateral to- and fro-movement, wherein first it is pushed aside in an elastic manner and subsequently moves back in an elastic manner to arrive in a locking position; with the characteristic that the insertion piece 17 is at least composed of, on the one hand, a movable hook-shaped portion 84 with a portion 85 extending laterally substantially in horizontal direction and forming said locking element 16, and an attachment portion 86 with which the insertion piece is provided in a recess 18 provided for this purpose.

In accordance with the nineteenth aspect of the invention, the locking element 16 has a height HL which is less than half of the height HI of the insertion piece and still better is less than ⅓ of this height.

It is clear that herein the advantages mentioned in the introduction are obtained.

FIG. 39 shows how the hook-shaped portion 85 is elastically displaced during joining of the floor panels 1.

In the embodiment of FIGS. 38 and 39, moreover the following characteristics are applied:

- the locking element 16 comprises a locking surface 87 and an opposite support surface 88, and the locking surface 87 is situated at that side of the locking element 16 which also forms the inner corner of the hook-shaped portion 84;
- the hook-shaped portion 84 can be tilted, preferably around a pivot point or pivot zone 89 which is situated lower than and preferably underneath said laterally-extending portion 85;
- the insertion piece 17 is situated at the female part, preferably in a recess 18 at the proximal side thereof;
- the hook-shaped portion 84 comprises a downwardly directed portion 90, wherein this downwardly directed portion 90 is in connection with the attachment portion 86 or as such forms a portion of the attachment portion 86, and wherein preferably this downwardly directed portion is made more rigid than the remainder of the insertion piece; in the example, this downwardly directed portion 90, which is made more rigid, extends from the portion 85 up to the pivot point 89;
- the downwardly directed portion 90 is supported at its lower extremity on the bottom of the recess 18 or the like;

apart from the downwardly extending portion 90 thereof, the attachment portion 86 comprises an elastic leg 91 extending backward in the recess 18 and extending upward, by which a smooth assembly as well as good features in respect to elastic behavior are obtained;

said elastic leg 91 preferably adjoins to the rear side of the portion 90, wherein the attachment part 86 then is formed by, on the one hand, this leg 91 and, on the other hand, the part of the portion 90 which extends from this adjoining up to the pivot point 89;

in downward direction, the male part rests directly on the female part, without intermediary of the insertion piece 17;

the insertion piece 17 is situated with its lowermost side or lowermost point higher than the lower side of the male part, in other words, higher than the lowermost point of the projection 10, with the advantage that a relatively good material thickness is kept underneath the insertion piece 17;

the movable portion 85 extending laterally substantially in horizontal direction and forming said locking element 16 comprises a locking surface 87 which forms an angle with the plane of the floor panel which is smaller than 45 degrees and still better is smaller than 30 degrees;

behind the locking element, more particularly behind the hook-shaped portion, a free space 92 is present allowing that the locking element 16 freely can move backward.

It is noted that various of the already earlier described embodiments also already apply the eighteenth and nineteenth aspect. This is also the case, for example, in FIG. 36. In this case, the hook-shaped portion is formed by the locking element 16 and the back part 22, whereas the attachment portion then is formed by the remaining portions of the insertion piece 17. Also the relation between the heights HL and HI indicated in FIG. 36 is in accordance with the requirements of the nineteenth aspect.

Figure 40:
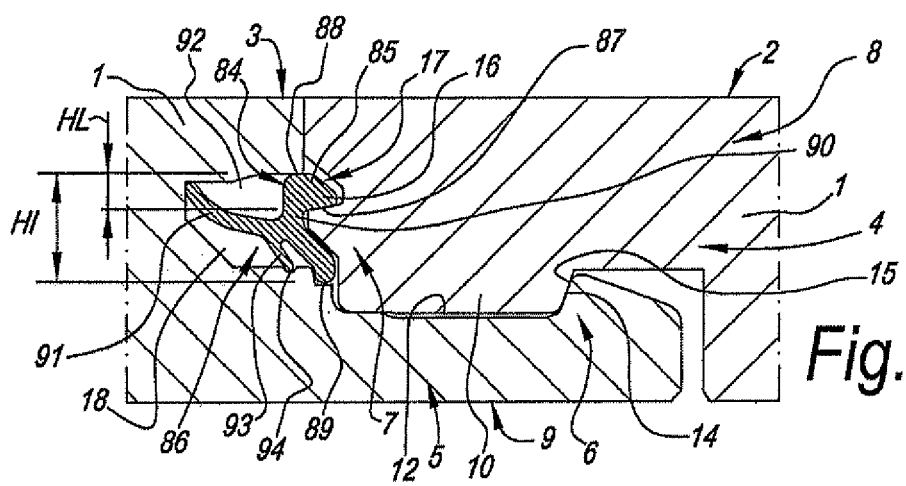
FIGS. 40 and 41 represent two variants of the embodiment of FIGS. 38 and 39.

FIG. 40 represents a variant of the embodiment of FIG. 38, wherein the attachment portion 86 comprises an extra portion 93, which engages with its extremity in a recess 94 provided for this purpose, by which a locking is obtained preventing that the insertion piece 17 slides out of the recess 18.

Figure 41:
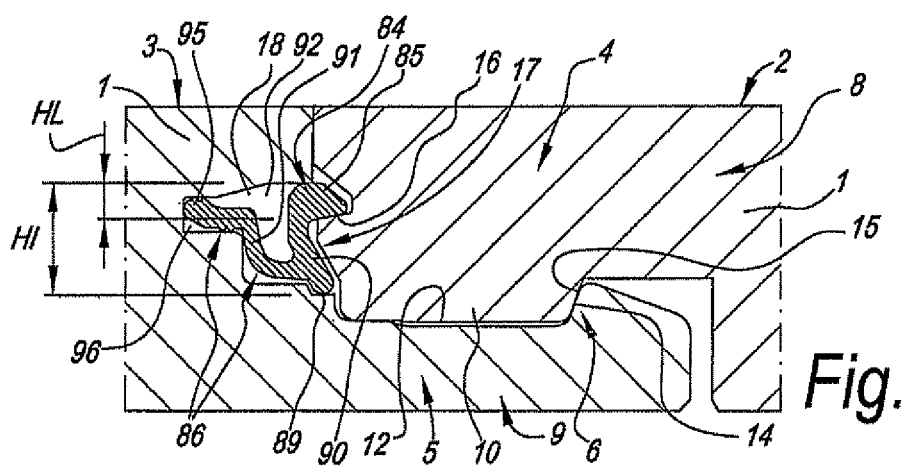

In the variant represented in FIG. 41, the leg 91 is provided with an integrally made therewith prolonged portion 95, which provides in an extra clamping function in that it sits clamped in an extra portion 96 of the recess 18.

From the above, it is clear that the invention, and in particular the locking element according to the invention, can be employed in a variety of floor panels, amongst others, in laminate floor panels, prefabricated floor panels, such as so-called "engineered wood", solid parquet, veneer parquet, as well as floor panels which are provided with any top layer, for example, vinyl, linoleum, stone, metal and the like. It is noted that the core of such floor panel does not necessarily have to consist of wood or a product on the basis of wood and principally can consist of any material, thus, for example, of synthetic material, too.

The insertion pieces of the invention are particularly interesting when they are applied with solid parquet or "engineered wood", as, by means of the locking element, the bottom part and the possible lip-shaped part thereof, they may form an effective means against the occurrence of creaking sounds. This is in particular the case when such insertion piece is manufactured of synthetic material.

Also, it is clear that the innovative coupling parts, locking systems and insertion pieces, according to a variant of the invention; also can be applied for coupling one or more pairs of opposite sides of, for example, wall panels or ceiling panels to each other. This is valid for all aspects of the invention. In these cases, too, an installation method as illustrated by means of FIG. 6 is possible. Of course, in these cases the term "downward movement" must be interpreted as a movement in the direction of the already installed panel and perpendicular to the decorative side of this already installed panel. Also, parts which in the description of the floor panels refer to an upper side, a bottom side or a "lateral direction" or the like, then must be interpreted in a suitable manner in function of the orientation of the wall or ceiling panel concerned. The decorative side of the wall panel or ceiling panel then has to be considered as corresponding to the upper side of the floor panel.

Finally, it is noted that the insertion piece of FIG. 16, instead of with a local basic part 50, might also be provided on a structure comprising, as aforementioned, a back part and possibly a bottom part and further possibly a lip-shaped part, too.

The present invention is in no way limited to the embodiments described by way of example and represented in the figures, on the contrary may such floor panels be realized in various forms and dimensions, without leaving the scope of the invention.

The invention claimed is:

1. A floor panel, comprising:
a top surface, at least two opposite sides, and at said opposite sides coupling parts enabling a first and a second of such floor panels to be coupled to each other;
wherein the coupling parts form a horizontally active locking system and a vertically active locking system;
wherein the horizontally active locking system comprises a male part and a female part, which enable said first and second floor panels to be connected to each other at said sides by locating one of the floor panels with its pertaining male part, by means of a downward movement, in the female part of the other floor panel;
wherein the vertically active locking system comprises a locking element, which forms part of an insertion piece provided in one of the respective sides;
wherein the locking element comprises at least a pivotable lock-up body, the pivotable lock-up body having a first extremity opposite a second extremity, the first extremity having an outer peripheral surface forming a stop-forming locking portion arranged to abut a locking surface of the first floor panel when the first and second floor panels are coupled to thereby provide a vertical locking action between the first extremity and said locking surface of the first floor panel, and the second extremity including a support portion including an outer peripheral surface arranged to abut a support surface of the second floor panel as the stop-forming locking portion of the lock-up body is engaged with the locking surface of the first panel to thereby provide a vertical locking action between the second extremity and said support surface of the second floor panel;
wherein one of said locking surface and said support surface is an upward facing surface provided at the male part, the upward facing surface facing toward said top surface;
wherein the lock-up body, by means of a hinge portion, is connected to a basic part pertaining to the insertion piece;
wherein the pivotable lock-up body and the basic part are provided with surfaces which, when the lock-up body is pivoted inwards, form guiding surfaces for each other and thereby determine the movement of the lock-up body;

wherein the guiding surfaces include a first guiding surface and a second guiding surface, the first guiding surface being configured to perform a pivoting movement about the second guiding surface;

wherein said first and second extremities of said lock-up body are located at opposite sides in respect to the guiding surface located at the pivotable lock-up body; and wherein, in the coupled condition of said first and second floor panels, one of said first and second extremities and the corresponding one of said locking surface and said support surface are located closer to the top surface than the guiding surfaces are to the top surface, whereas the other of said first and second extremities and the thereto other corresponding one of said locking surface and said support surface are located farther from the top surface than the guiding surfaces are from the top surface, the other thereto corresponding one of said locking surface and said support surface being constituted by said upward facing surface provided at the male part.

2. The floor panel of claim 1, wherein the insertion piece is provided in a recess in the female part.

3. The floor panel of claim 1, wherein the cooperation between the pivotable lock-up body and the basic part is obtained in two steps, wherein in the first step the lock-up body is pushed aside with a smaller force than in the second step.

4. The floor panel of claim 1, wherein the lock-up body comprises a rigid element.

5. The floor panel of claim 1, wherein the insertion piece is configured such that in the free condition a distance is present between the basic part and the lock-up body.

6. The floor panel of claim 1, wherein the cooperation among said surfaces provides for that the pivotable lock-up body, next to its extremity situated next to the hinge portion, is pressed against the support surface of the second floor panel.

7. The floor panel of claim 1, wherein the coupling means are configured such that two of such floor panels, at the respective sides where they can be brought into each other by a downward movement, also can be joined into each other and/or taken out of each other by means of a turning movement (W).

8. The floor panel of claim 1, wherein the coupling means are configured such that two of such floor panels, at the respective sides where they can be brought into each other by a downward movement, also can be joined into each other by means of a translation wherein the floor panels are laterally moved towards each other.

9. The floor panel of claim 1, wherein the panel is rectangular and wherein said two opposite sides form a first pair of sides, whereas the remaining pair of opposite sides define a second pair of sides;

wherein at said second pair of sides coupling parts are applied which allow a connection of one panel to another by a turning-down movement;

the coupling parts at the first pair of sides and the second pair of sides being configured such that said turning-down movement at the second pair of sides, automatically results in an engagement between adjacent panels at the first pair of sides.

10. The floor panel of claim 1, wherein the guiding surfaces are arranged to engage one another as the pivotable lock-up body pivots relative to and toward the basic part.

11. The floor panel according to claim 1, wherein the first guiding surface is provided on the pivotable lock-up body and the second guiding surface is provided on the basic part.

12. The floor panel according to claim 11, wherein the second guiding surface is provided on at an end portion of the basic part.

13. The floor panel according to claim 11, wherein the second extremity is coupled to the hinge portion and the first extremity is a free extremity.

14. The floor panel according to claim 13, wherein a contact surface of the pivotable lock-up body opposite from the first guiding surface is configured to contact and guide a surface of a locking portion of a male part of a similar floor panel.

15. The floor panel according to claim 13, wherein the hinge portion is a resilient portion urging the lock-up body into a locked position.

16. The floor panel according to claim 11, wherein the first guiding surface is also configured to slide along the second guiding surface during said pivoting movement.

17. The floor panel according to claim 1, wherein the first guiding surface includes a corner portion protruding out from the first guiding surface.

18. The floor panel according to claim 17, wherein, a concave portion of the corner portion protruding out from the first guiding surface, upon contacting the second guiding surface, is configured to substantially rotate around an outer corner of the second guiding surface.

* * * * *